United States Patent
Barmettler et al.

(10) Patent No.: US 10,244,413 B2
(45) Date of Patent: Mar. 26, 2019

(54) SYSTEM AND METHOD FOR GENERATING A GRAPHIC ILLUSTRATION OF WIRELESS NETWORK PERFORMANCE

(71) Applicant: GREENLEE TEXTRON INC., Rockford, IL (US)

(72) Inventors: Mark Barmettler, San Diego, CA (US); Jason Jose Graziani, Shrewsbury, MA (US)

(73) Assignee: Tempo Communications, Inc., Vista, CA (US)

( * ) Notice: Subject to any disclaimer, the term of this patent is extended or adjusted under 35 U.S.C. 154(b) by 127 days.

(21) Appl. No.: 15/048,801

(22) Filed: Feb. 19, 2016

(65) Prior Publication Data

US 2016/0249241 A1    Aug. 25, 2016

Related U.S. Application Data

(60) Provisional application No. 62/118,607, filed on Feb. 20, 2015.

(51) Int. Cl.
| | |
|---|---|
| *G06F 3/0484* | (2013.01) |
| *H04W 24/08* | (2009.01) |
| *G06F 3/0481* | (2013.01) |
| *G06T 11/20* | (2006.01) |
| *G06T 15/20* | (2011.01) |
| *G06T 17/20* | (2006.01) |

(52) U.S. Cl.
CPC ........ *H04W 24/08* (2013.01); *G06F 3/04815* (2013.01); *G06F 3/04847* (2013.01); *G06T 11/206* (2013.01); *G06T 15/205* (2013.01); *G06T 17/20* (2013.01)

(58) Field of Classification Search
CPC .......... G06F 3/00; G06F 3/048; G06F 3/0481; G06F 3/0484; G06F 3/04815; G06F 3/04847; G06F 17/50; H04W 24/00; H04W 24/02; H04W 24/08; G06T 11/20; G06T 11/206; G06T 15/20; G06T 15/205; G06T 17/20
See application file for complete search history.

(56) References Cited

U.S. PATENT DOCUMENTS

| | | | |
|---|---|---|---|
| 6,499,006 B1 * | 12/2002 | Rappaport | H04W 16/20 703/20 |
| 7,515,916 B1 | 4/2009 | Alexander | |
| 7,539,489 B1 * | 5/2009 | Alexander | H04W 24/06 370/241 |
| 7,596,373 B2 | 9/2009 | McGregor et al. | |

(Continued)

FOREIGN PATENT DOCUMENTS

| | | |
|---|---|---|
| EP | 2874429 A1 | 5/2015 |
| WO | 2009022054 A1 | 2/2009 |
| WO | 2013152305 A1 | 10/2013 |

OTHER PUBLICATIONS

Wi-Fi site Surveys, Planning, WLAN Troubleshooting Software, http://www.ekahau.com/wifidesign/ekahau-site-survey, printed Apr. 19, 2016, Copyright 2015.

(Continued)

*Primary Examiner* — Xiomara L Bautista
(74) *Attorney, Agent, or Firm* — Erise IP, P.A.

(57) ABSTRACT

A system and method for generating a three dimensional graphic illustration of wireless communication system performance in a building.

25 Claims, 25 Drawing Sheets

(56) References Cited

U.S. PATENT DOCUMENTS

| | | | |
|---|---|---|---|
| 7,889,663 B1 | 2/2011 | Wright et al. | |
| 8,023,418 B2 | 9/2011 | Curley | |
| 8,390,515 B2 | 3/2013 | Ketonen | |
| 8,625,441 B2 | 1/2014 | Hittel et al. | |
| 8,654,660 B2 | 2/2014 | Ketonen | |
| 8,750,806 B2 | 6/2014 | Weil et al. | |
| 8,824,328 B2 | 9/2014 | Dhanapal | |
| 9,924,388 B2* | 3/2018 | Zhang | H04W 24/06 |
| 2002/0111772 A1* | 8/2002 | Skidmore | H04L 41/12 |
| | | | 702/186 |
| 2003/0055604 A1* | 3/2003 | Skidmore | H04L 41/12 |
| | | | 702/186 |
| 2003/0229478 A1* | 12/2003 | Rappaport | H04W 16/20 |
| | | | 703/13 |
| 2004/0137915 A1 | 7/2004 | Diener | |
| 2005/0043933 A1* | 2/2005 | Rappaport | H04L 41/22 |
| | | | 703/1 |
| 2005/0055604 A1 | 3/2005 | Chen | |
| 2007/0082677 A1* | 4/2007 | Donald Hart | H04W 16/18 |
| | | | 455/456.1 |
| 2010/0290359 A1* | 11/2010 | Dewey | G05B 19/4185 |
| | | | 370/252 |
| 2012/0129559 A1* | 5/2012 | Pochop, Jr. | H04W 16/18 |
| | | | 455/507 |
| 2012/0307662 A1 | 12/2012 | Puolakka et al. | |
| 2013/0051252 A1* | 2/2013 | Ciavattone | H04L 43/10 |
| | | | 370/252 |
| 2014/0029450 A1* | 1/2014 | Vitek | H04W 16/28 |
| | | | 370/252 |
| 2014/0160971 A1 | 6/2014 | Ketonen | |
| 2014/0160972 A1 | 6/2014 | Ketonen | |
| 2014/0330541 A1 | 11/2014 | Natarajan | |
| 2015/0103685 A1 | 4/2015 | Butchko et al. | |
| 2015/0131483 A1* | 5/2015 | Colban | H04W 48/16 |
| | | | 370/254 |
| 2016/0191357 A1* | 6/2016 | Orner | H04W 24/02 |
| | | | 370/328 |
| 2016/0212633 A1* | 7/2016 | Flanagan | H04W 24/02 |
| 2016/0323760 A1* | 11/2016 | Zhang | H04W 24/06 |
| 2017/0171760 A1* | 6/2017 | Kamalakannan | H04W 16/18 |

OTHER PUBLICATIONS iBwave, "In-Building Wireless Network Design Software, iBwave Design," http://www.ibwave.com/Products/iBwaveDesign.aspx. printed Apr. 19, 2016, posted unknown.

Greenlee Communications, "AirScout Automated WiFi Readiness," http://www.greenleecommunications.com/products/airscout-wifi-readiness.html, printed Apr. 19, 2016, Copyright 2016.

Fluke Networks, "Airmagnet Planner Technical Data," Copyright 2011.

Greenlee Textron, Inc., "Greenlee Communications AirScout Instruction Manual 52075869REV01," Copyright 2016.

PCT Patent Application PCT/US2016/018826 International Search Report and Written Opinion dated May 10, 2016, 15 pages.

European Patent Application 17166913.8 Search Report dated Oct. 8, 2017.

European Patent Application 14187880.1 European Examination Report dated Apr. 16, 2015.

European Patent Application No. 14187880.1 Office Action dated Jun. 28, 2017.

Measurement Proposal Greenlee Project Orion Jul. 31, 2014.

* cited by examiner

SYSTEM AND METHOD FOR GENERATING A GRAPHIC ILLUSTRATION OF WIRELESS NETWORK PERFORMANCE

CROSS-REFERENCE TO RELATED APPLICATIONS

This non-provisional application claims priority of U.S. Provisional Patent Application No. 62/118,607 filed on Feb. 20, 2015, which application is incorporated herein by reference.

BACKGROUND

Because of interference, congestion and signal issues, users of a wireless network often experience degradation of services over the wireless network depending on where they are located while accessing the wireless network. Currently employed wireless network installation and validation methods are often inadequate identifying the causes of wireless network degradation, or in aiding with the design of wireless networks in a building to reduce network degradation. The inability to identify and correct network degradation can negatively affect a wireless network user's quality of experience and can therefore result in excess service and repair visits, customer dissatisfaction, and customer turn over.

Proper placement of wireless transceivers such as Wi-Fi™ access points, gateways, routers, repeaters, range extenders, as well as the user devices in a building or premises can improve wireless network quality of service. However, the currently available systems and methods for placing such wireless devices often result in inconsistent or poor quality of service levels across a building or premises. Such methods are often driven by a desire to select the most convenient location for the wireless network access point and a presumption that it will adequately serve all desired user wireless network devices within the premises. This method of locating wireless network access devices does not take into account interference or attenuation caused by the building or other devices in the building, and therefore often results in poor quality of service. Further, existing wireless network devices are not targeted or configured for wireless network testing, but are configured for wireless network usage only. There exist some wireless network testing devices, however the use of such devices requires that a technician walk to each location within the premises served by the wireless network to validate the wireless network quality of service. This is particularly problematic where the premises are a multiple story building, such as a home or a small office. If the quality of service is unacceptable at any location in the premises, technicians must move the wireless network access point, repeater or range extender to a new position or install additional such devices at new locations that are presumed to increase network performance. The technician must then repeat the entire quality of service validation.

Current wireless network tester devices are also limited as they do not allow the installer or technician to select either an initial location or a secondary position for the access point and other wireless network devices based on objective performance criteria that can be used by the installer to maximize network performance, minimize network cost, or meet other criteria for the network.

As such there is a need for a system and method that can be used by an installer or technician of a wireless network as an aid in the design, testing and installation of the wireless network device layout in a building or premises based on objective criteria measuring the performance of the wireless network in serving wireless devices within the building.

SUMMARY

The inventors hereof have succeeded at designing a system and method generating a three-dimensional graphic illustration on a display of a computing device of objective wireless network performance data to enable a wireless network technician or installer to quickly and easily locate preferred wireless network access device locations based on wireless network performance in a building having one or more floors, or other premises.

In one embodiment, a method is described for analyzing the performance of a wireless network in a building having one or more floors. The method comprises receiving a floor layout for each floor of the building, receiving a location for at least one wireless network device on one of the floor layouts, receiving a wireless network performance data set having wireless network performance data values for a wireless network performance parameter for the wireless network device, generating a three dimensional projection of the floor layouts, depicting the layouts in a spaced apart relationship representative of the physical relationships of the floors in the building, and generating a wireless network performance image on the floor layout showing a graphical representation of wireless network performance data values.

In some embodiments of the method, generating a wireless network system performance image comprises generating an image representative of the wireless network performance data values applicable to the floor layouts, and projecting the image onto the three dimensional projection of the floor layout. In some embodiments, generating an image representative of the wireless network performance data values comprises mapping the wireless network performance data values to colors, and generating an image comprising the mapped colors at the position of each data value.

In other embodiments, generating an image representative of the wireless network performance data values comprises selecting boundary values between selected levels of performance, assigning each wireless network performance data value to a selected level of performance based on the relationship between the data value and the boundary values, and generating an image depicting the location of the boundaries between the selected levels of performance on the floor layout.

In other embodiments, generating an image representative of the wireless network performance data values comprises generating a heat map image representative of the data values for the floor layout. In other embodiments, generating a wireless network system performance image comprises modifying the image by selectively removing or adding wireless network performance data values.

In some embodiments of the method described herein, the floor layouts comprise a planar data set, and a three dimensional projection of the floor layout is an isometric model of the planar floor layout. In other embodiments, the floor layout data set comprises data defined by x-y coordinates within a floor coordinate system and the location of the at least one wireless network device comprises x-y coordinates in the floor coordinate system, and generating the three dimensional projection of the at least one floor layout comprises aligning the floor coordinate systems of each of the floor layouts and projecting the x-y coordinate data onto the three dimensional projection.

In some embodiments, the wireless network performance data values are related to a location defined by x-y coordinates within the floor coordinate system; and generating a wireless network performance image comprises projecting the x-y coordinate data onto the performance image. In some embodiments, the three dimensional projection is an isometric projection.

In some embodiments, the floor layouts are three dimensional data sets defined within a floor coordinate system and the location of the at least one wireless network device comprises three dimensional data in the floor coordinate system, and generating the three dimensional projection of the floor layouts comprises aligning the floor coordinate systems of each of the at least one floor layouts and projecting the three dimensional data onto the three dimensional projection. In some embodiments, the wireless network performance data values are related to a location defined by a three dimensional coordinate data within the floor coordinate system, and generating a wireless network performance image comprises projecting the three dimensional coordinate data onto the performance image. In some embodiments, the three dimensional coordinate data are defined by x, y, and z coordinates in the floor coordinate system. In further embodiments, the three dimensional projection is an isometric projection. In other embodiments, the floor coordinate systems are defined within a building coordinate system.

In some embodiments, generating the wireless network performance image comprises projecting a three dimensional color coded mapping of the at least one wireless network performance data values to the locations defined by the three dimensional coordinate data. In other embodiments, generating the wireless network performance image comprises generating a wire frame mapping of the wireless network performance data values, and projecting the wire frame mapping onto the performance image.

In some embodiments the process of receiving the floor layouts utilizes a graphical user interface having graphically enabled tools for creating the floor layout to create an illustration of the at least one floor layout, specify the spaced apart relationship between each of the floor layouts, and specify the location of the wireless network device on each floor layout.

In some embodiments, a device profile is received for the wireless network device, the device profile including one or more of: a type, a model, and a technical parameter. In some embodiments this further comprises receiving a device identification for the wireless network device selected from the group consisting of a wireless network router, a wireless network gateway, a wireless network access point, a wireless network repeater, a wireless network range extender, a wireless network antenna, and a wireless network user device.

In other embodiments, receiving the floor layout corresponding to a floor of the building comprises receiving a floor layout file containing a representation of a floor of the building, generating the floor layout from the representation in the floor layout file. In some embodiments, the floor layout file is selected from the group consisting of a photographic image file and a computer aided design file.

In some embodiments, the method described herein also comprises analyzing the wireless network performance data set to identify a recommended location for a wireless device, depicting the recommended location on the three dimensional projection of one of the at least one floor layouts.

In some embodiments, a first wireless network device is a wireless network master controller, and a second wireless network device is a wireless network instrument for measuring wireless network performance data values. In these embodiments, the wireless network master controller and the wireless network instrument may be components of a distributed wireless network testing system. In some of these embodiments, the distributed wireless network testing system generates the wireless network performance data set comprising the wireless network performance data values measured by the wireless network instrument.

In various embodiments, the wireless network performance parameter is selected from the group consisting of a radio frequency signal strength for one or more radio frequencies or frequency bands, a power measurement, a frequency response, a polarization measurement, a phase shift measurement, a modulation measurement, a signal to noise ratio measurement, a bandwidth measurement, a time delay measurement, a network congestion measurement, and application level performance metrics such as a quality of service metrics for video streaming, audio streaming, gaming, and web browsing. In some embodiments, the wireless network performance parameter is an application level quality of service value.

In still further embodiments, the application level quality of service value is the bandwidth for an application of 4K HD streaming video. In one such embodiment, the wireless network performance image is color coded to display the bandwidth according to the following mapping:

bandwidth of 48 Mbps or greater assigned green;

bandwidth of 30 Mbps or greater and less than 48 Mbps assigned light green;

bandwidth of 24 Mbps or greater and less than 30 Mbps assigned yellow;

bandwidth of 20 Mbps or greater and less than 24 Mbps assigned orange;

bandwidth of 14 Mbps or greater and less than 20 Mbps assigned light red;

bandwidth less than 14 Mbps assigned dark red.

DETAILED DESCRIPTION

Figure 1:
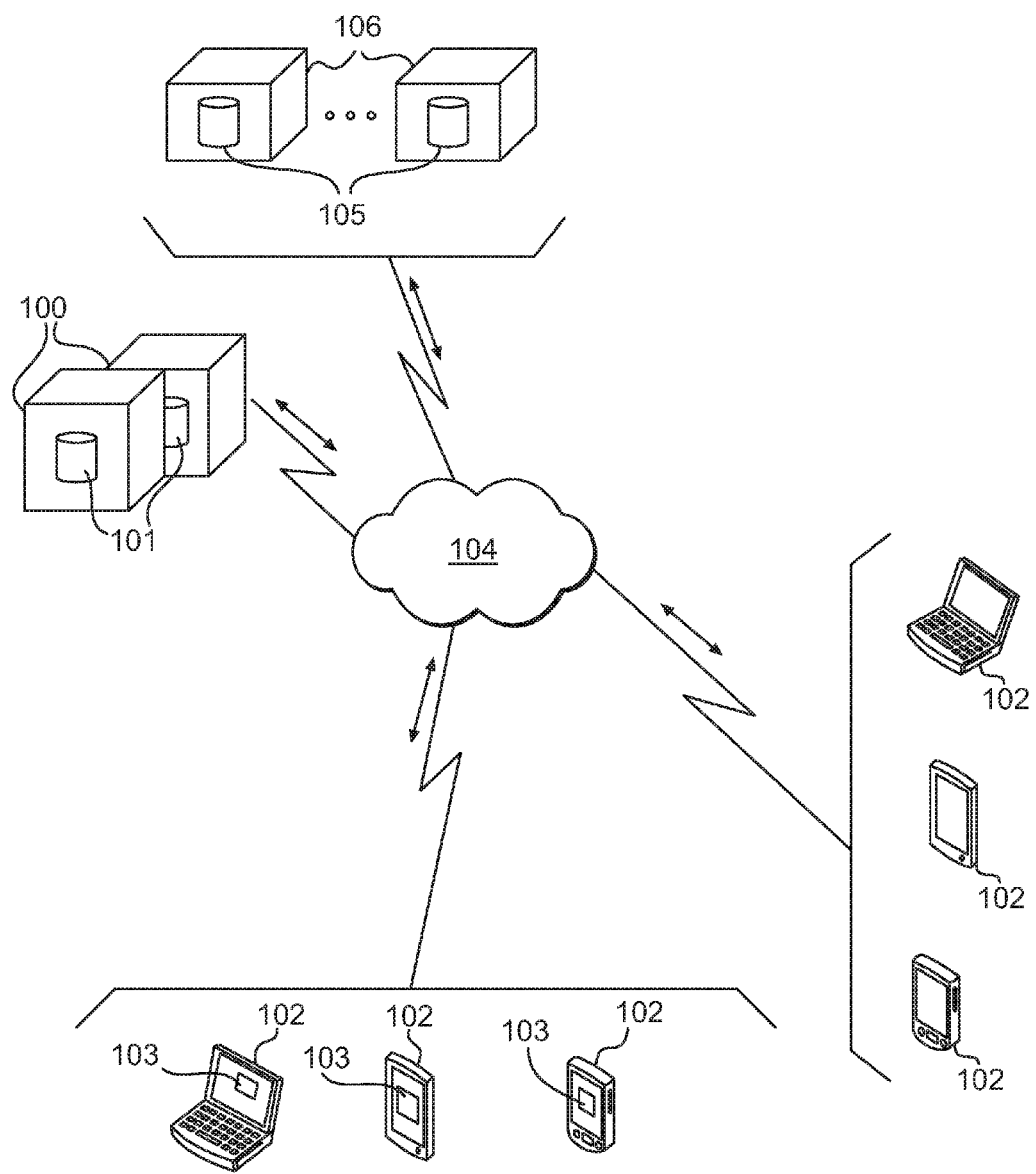
FIG. 1 is a schematic diagram of a system for graphically displaying wireless network performance in a building according to one embodiment of the disclosed system and method.

The present disclosure incorporates the disclosure of U.S. patent application Ser. No. 14/506,106, filed Oct. 3, 2014, and U.S. Provisional Patent Application No. 61/890,171, filed Oct. 11, 2013, the entire contents of each being incorporated herein and not repeated or duplicated. In the referenced patent applications, a system and method for testing a wireless network is disclosed, including the use of wireless network master controllers and wireless instruments to measure and collect wireless network performance data sets comprising data values representative of various wireless network performance parameters.

The present disclosure relates to wireless networks and, more specifically, to systems and methods for graphically displaying wireless network system performance. More specifically, this disclosure relates to systems and methods for analyzing wireless network performance in buildings having one or more floors.

Additionally, the system and method disclosed herein provide a capability to a user and in particular a user of computing devices to analyze and optimize the performance of a wireless network. As computing devices are increasingly mobile computing devices that access wireless network resources, the performance of these networks must be optimized. Various technologies and design choices are available for implementation of the systems and methods disclosed herein. In particular, system functionality may be implemented in a user computing device as enabled by a user application, and may also be implemented in one or more centralized servers (often referred to as backend server/mobile web service). In some embodiments, a "smart client" application architecture may be utilized for the system. However, those of skill in the art will understand that the actual distribution of computing processes between user devices, distributed devices or network servers is not limiting of the system described herein, and that one or more of the functions and operations and methods as described to be implemented on a user computing device application or on a server, and that a "thin client" architecture, a web page hosting client, to a "thick client" architecture may be utilized and still be within the scope of the present disclosure. Further, as known in the art, implementation technologies vary by computing platform and by design choice as to being a native or cross-platform implementation. In some embodiments the computing device application can be developed as a native application for a particular mobile device and operating system. However, as one of ordinary skill in the art will understand, due to higher availability of consistent broadband connectivity that some implementations will be device independent and browser-based with the user computing device acting as an application user interface to an application specific website on the application/back-end server. This disclosure utilizes a selected "smart client" architecture using a selected one example mobile application technology (Apple® iOS) as one example embodiment and this selection is not intended to be limited thereto as one of ordinary skill in the art will understand upon review. The various software components of the system may as a combination be referred to as the system application. In some embodiments the system application may execute on a single computing device or its components may be divided among a plurality of computing devices. All or some of the functions of the system application may be incorporated into the centralized resource system, the local resource manager, and the content servers.

The described system and method is not limited to any particular computing device technology or underlying device design, and may incorporate any computing device without reference to type of processor, memory, or specific technology.

Referring now to FIG. 1, an embodiment of the present system is depicted. In the depicted embodiment, at least one remote computing device 100 provides a centralized resource system (CRS) 101 which may be a web service, a server program, or similar process providing support to at least one user computing device 102 that are used to access the system. A plurality of CRS 101 may be provided, with each CRS 101 offering the same functions or with various functions distributed across the various CRS 101 elements. The user devices 102 may be fixed or mobile computing devices. In some embodiments, the user devices 102 have a notification and communication manager, such as a mobile application or "app" referred herein to as the local resource manager (LRM) 103, as described in greater detail in the following disclosure. The LRM 103 is typically a mobile application resident from a download on the user device 102 that is integrated within into the operational, control and third party application interfaces thereon. In some embodiments, there is no LRM 103 on the user device 102, but instead the user may use a native web browser or similar application provided on the device 102.

The user device 102 is generally communicatively coupled via a communication network 104 to a remote device 100. The network may be of any type known to one of skill in the art and many include wide area or local area networks, either in an open standard or in a proprietary manner for interchanging application code, system user data, notifications and other data between the centralized resource system 101 and the local resource manager 103 as will be described herein or understood by those of ordinary skill in the art upon reviewing the present disclosure.

The remote device 100 is, and in some embodiments the user device 102 are, communicatively coupled via a communication network 104 to one or more third-party content servers 106 providing services 105 such as third party database services, data or file service, web hosting servers, or other application servers.

A system user comprises an authorized and registered user of the system, with access to a computing device 102 and access to one or both of the centralized resource system 101 and local resource manager 103. The system user typically will have an account or user identification with the CRS 101 or utilize a proprietary LRM 103. The system user is usually a person, but could be one or more persons working together in some embodiments. Each system user has a unique system user ID for system user defined services and functionality with the CRS 101 and LRM 103.

In some embodiments, the centralized resource system 101 are located on one or more centralized servers 100

(often referred to as backend server/mobile web service) providing services and functions as described herein in support of and in cooperation with the local resource manager 103 depending on the particular implementation of the system. In some embodiments of the system, a "thin client" architecture is utilized wherein the CRS 101 performs most of the system and method functions, and hosting web pages via the network 104 to the LRM 103 or a web client. In other embodiments, a shared functionality of a "smart" client architecture may be utilized whereby some application logic is executed by CRS 101 and some is executed by LRM 103. In still other embodiments, the CRS 101 may provide simple back office or data support and functions, while LRM 103 is capable of executing most functions of the system without CRS 101 in a "thick client" architecture. Other system architectures may be utilized within the scope of the invention.

User computing device 102 comprises a computing device used by the user to access the system, such as a mobile device or a personal computer. The computing devices 102 typically include a display such as a screen that provides a display of the content received from CRS 101 or content presented by the LRM 103 that is typically resident on the computing device 102. A graphical user interface (GUI) is the screen presentation on a display of the information received from CRS 101 that, in some embodiments, includes menus including pull-down menus, pointers, icons, menus, windows, images, text and data. The GUI typically uses screen presentations such as windows, icons, and banners in additional to images and text. As described herein an icon is a graphic indicator or symbol on a display identifying and providing a visual link to a resource within the LRM 103 such as a user resource, a third party application or program, a device or system user device feature, a command, file or directory or which when activated by the system user opens the user resource in the display displaying the details of the user resource thereon. The icons are generally analogous to buttons as they are configured for receiving a system user selection referred generally as a "clicking" or "selecting" of the icon which result in the resource being activated or can result in the opening of a window in the current display or in a separate display or can provide for a re-direction such as to a webpage by opening a co-resident web browser, another window or initiate another app or program or resource within the LRM 103, such as an image, text, document or resource, along with a co-resident viewer app as associated with the format of the resource. This can include hot linking as well as hypertext links. This can also include opening a data file or library such as of stored images, or documents such as stored floor plan layouts or data sets. Generally, an icon differs from a window as they lack most of the functions and components of windows, and therefore will be referred herein also as a button for clarity purposes. The foregoing description of a graphical user interface is not limiting of the scope of the disclosure, as, within the scope of the disclosure, various embodiments use various graphical user interface elements and systems that have not yet been developed, or display technologies that have not yet been developed.

In some embodiments, the user computing device 102 may include an LRM 103 that provides functionality to the user computing device 102 and specialized services to the system user via an enhanced user interface with integrated functionality. One service and functionality of the LRM 103 is to provide the system user with a plurality of various displays or screens, each of which includes one or more icons, windows and content presentation such as text and data. The LRM 103 alone and with integrated support from the CRS 103 provides the computing device 102 of the system user with enhanced operational functionality and integration with third party devices, third party applications and third party data. With integrated and automated communications within the LRM 103, the LRM 103 provides a unique self-contained user experience to the system user for the features and functions of the system as described in the various embodiments of the system and method.

In one embodiment the LRM 103 is a mobile application or "app" that is compiled software created for a particular use or added functionality over the native operating system of a mobile device which is the software that uses the programming language of a specific computing platform and is typically limited to that platform unless portable to others on top of the native firmware of the computing device.

In some embodiments, the LRM 103 is configured to include an application programming interface or software development kit (SDK) interface with co-resident application on the same computing device. The co-resident applications include a web browser for accessing and displaying web content. An SDK is one example of a self-contained library or framework enabling the extension of functionality of a third party library into and with the LRM 103 as described herein. For native applications, the SDK can be defined by the native SDK tied to the native operating system such as Android SDK, iOS SDK, by ways of example. Other co-resident applications can also have their own SDK. For example, the LRM 103 of some embodiments may include an interface to a co-resident app's SDK to enable the LRM 103 to integrate features of the co-resident application on the computing device 102 within the LRM 103 or CRS 101. This interface permits the system user to access functionality of the co-resident application without having to exit the LRM 103 system and application. The LRM 103 can have an SDK or API profile interface for each co-resident application as described in some of the functions herein for integration to provide one or more integrated development environment (IDE) plugins into desired third party applications for a seamless system user experience of the LRM 103 and system and methods described herein and without having to replicate such third party application feature within the present system. Additionally from the other perspective, the LRM 103 or CRS 101 may include an API or an SDK that enable other co-resident applications to utilize some of the features of the LRM 103.

In some embodiments, the LRM 103 can be implemented in some embodiments as a hybrid application comprising software that combines a native application with a web application to provide the ability to utilize native device functionality of the device such as the camera, GPS, communication interfaces such as Bluetooth™, an accelerometer, or other distributed native applications, but the LRM 103 is essentially a thin client or web application with a native outer shell or wrapper. The LRM 103 by itself or in cooperation with the CRS 101 can enable certain services or obtain data to be received or utilized by the LRM 103 to perform one or more of the tasks and operations as described herein or in support thereof.

In various embodiments, the system described herein utilizes a building profile to characterize a specific building with which the system will be used to test and configure a wireless network. Each building profile can be defined or specified by the system user as will be described herein through manipulation of the user interface of the LRM 103 or CRS 101, as imported from a building data file or drawing or image or the like, or based on predefined forms or templates for building floor plans. The building profile can include building characteristics that are predefined or static as well updated or changed floor layout data such as walls and furniture that can be added or changes from time to time such as by the system user via the LRM 103. In various embodiments, the building profiles may be stored in the LRM 103, CRS 101 or content servers 106.

Figure 13:
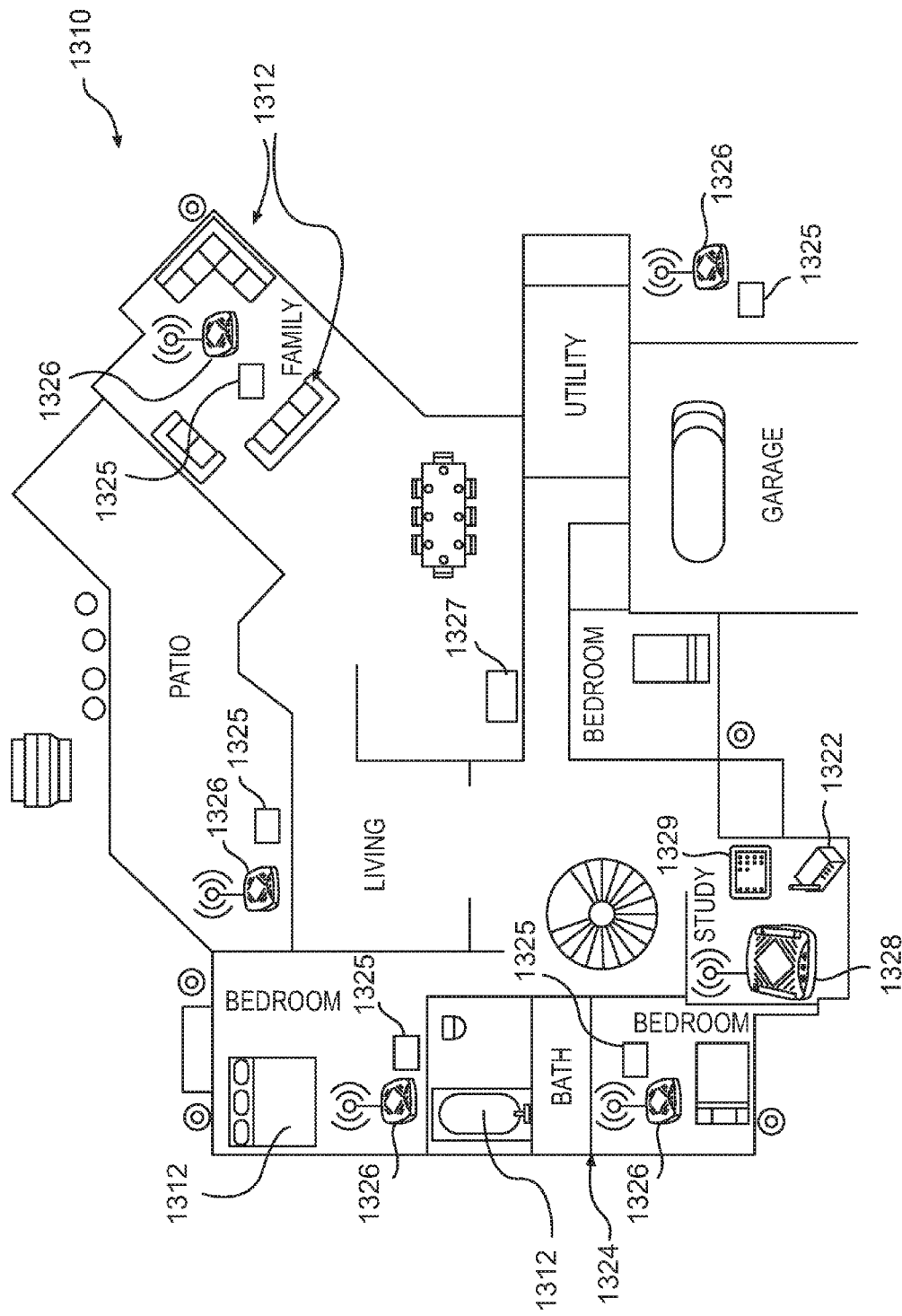
FIG. 13 is a top plan view of a floor layout having floor layout details including wall, furniture and a plurality of wireless network devices according to one embodiment of the disclosed system and method.

In various embodiments, the system disclosed herein is used to configure and test wireless networks formed by one or more wireless network devices such as devices 1326 depicted in FIG. 13. As described herein, wireless networks and devices can be any wireless technology or protocol and as described in some example embodiments are Wi-Fi™ compatible devices. This can include, but is not limited to, IEEE compatible devices for 802.11 standards such as 802.11 a/b/g/n/ac/ad/af/ah or as otherwise may be developed in the future by the IEEE or other standards body or that may be manufacturer proprietary technology.

Each wireless device 1326 can be defined with a wireless device profile either as predefined in a device library accessible by the system user, or can be defined by the system user from time to time through manipulation of the user interface of the LRM 103 or CRS 101 for inputting device data. This can also include importing a wireless device data file that includes technical characteristics of the wireless device such as model, manufacturer, and technical specifications. The device profile can include wireless device characteristics that are predefined as well updated or changed wireless device data such as channels, frequency, etc. that can be added or changed from time to time by the system user via the LRM 103 or CRS 101. The system user can also define each device 1326 with a name, such as a location name, for easy identification in an implementation and in relation to the building space or premises for which the wireless network is being designed. In various embodiments, the device profile may be stored in LRM 103, CRS 101 or content servers 106.

In various embodiments of the system and method described herein, the system may store additional information regarding the building and devices to be analyzed using the system. This data may include, in various embodiments, data sets containing measurements at various points in the actual building of the performance (via parameters such as signal strength) of the wireless devices 1326 in the building. The building profiles, the device profiles, and any additional information used by the system may be stored in the LRM 103, the CRS 101, or content servers 106. Content servers 106 may be servers or web services 105 of any type available for storing and retrieving information over a network, such as database servers, web servers, file servers, or other types of network resources for storing and retrieving data.

In various embodiments, the content servers 106 or CRM 101 may store Device IDs (for Anonymous Users), building profiles, Wi-Fi device profiles, Wi-Fi performance data and the other data as described herein. One skilled in the art will recognize that any particular piece of information can be stored in the database located on thereon or in a local database located on the user device 102 without departing from the scope of the current disclosure.

It should be understood that the LRM 103 and CRS 101 can each be implemented on a single described platform or operating environment, or can be a distributed implementation across multiple platforms and operation environments utilizing a communications network and still be within the scope of the present disclosure. Any computing device capable of network communication may be used to provide the LRM, the CRS or the content services.

In various embodiments, the system and method may be implemented as a series of interconnected web pages or as a mobile app. As one skilled in the art will appreciate the series of interconnected web pages or mobile app screens, portions thereof or data field or link contained therein, can be constructed from the information in the system and method, as that information is described herein. The information can be used for simply display, can be shown as hyperlinks or other navigation controls, including but not limited to buttons, as is known in the art. The hyperlinks or other navigation controls can be used to link, provide data, or provide navigation between the individual pages or screens that make up the series of interconnected web pages or mobile app.

In one embodiment, the present disclosure includes a method for generating a three-dimensional graphic illustration on a display of wireless network performance in a multiple floor building. In some embodiments, the method includes the receiving a lower floor layout data set for a lower floor of the building indicative of a lower floor layout and receiving an upper floor layout data set for an upper floor of the building indicative of an upper floor layout. In some embodiments there may be more than two floors in the building and therefore the system could include receiving floor layout data sets for each of the floors. Furthermore, as the building could be on a premises with surrounding land or outdoor structures for which wireless network access may be desired, one or more of the received data set can include not only spaces defined within the building but can also include premises portion external but associated with or adjacent to the building or particular floors of the building.

In some embodiments, performance data for the building or floor layout is stored by the system. These data sets include wireless network performance data values that represent various wireless network performance parameters at various locations in or around the building as described below. In some embodiments, the performance data set may be related to a specific floor layout, while other performance data sets may not be related to a specific floor layout. In some embodiments, the performance data sets include data values based on actual measurements of various parameters characterizing the performance of a test or actual wireless network. In other embodiments, the data set may comprise data values based on simulations or models of various parameters characterizing the performance of a wireless communication system.

In some embodiments, the method also includes generating on a computer display a three dimensional graphic illustration of the building including one or more floor layout. If there is more than one floor layout, the lower floor layout from the lower floor layout data set and the upper floor from the upper floor layout data set may be depicted with a spaced apart relationship of the upper floor layout relative to the lower floor layout, such as that shown in FIG. 5. This generated display can include additional floors and exterior portions of the premises containing the building where available or applicable. The receipt of the floor layout data sets can be by various methods, including without limitation, imported floor layouts, user input of a floor layout, or selection of a floor layout from a CRS 101, content servers 106, or other local or remote source.

Figure 2:
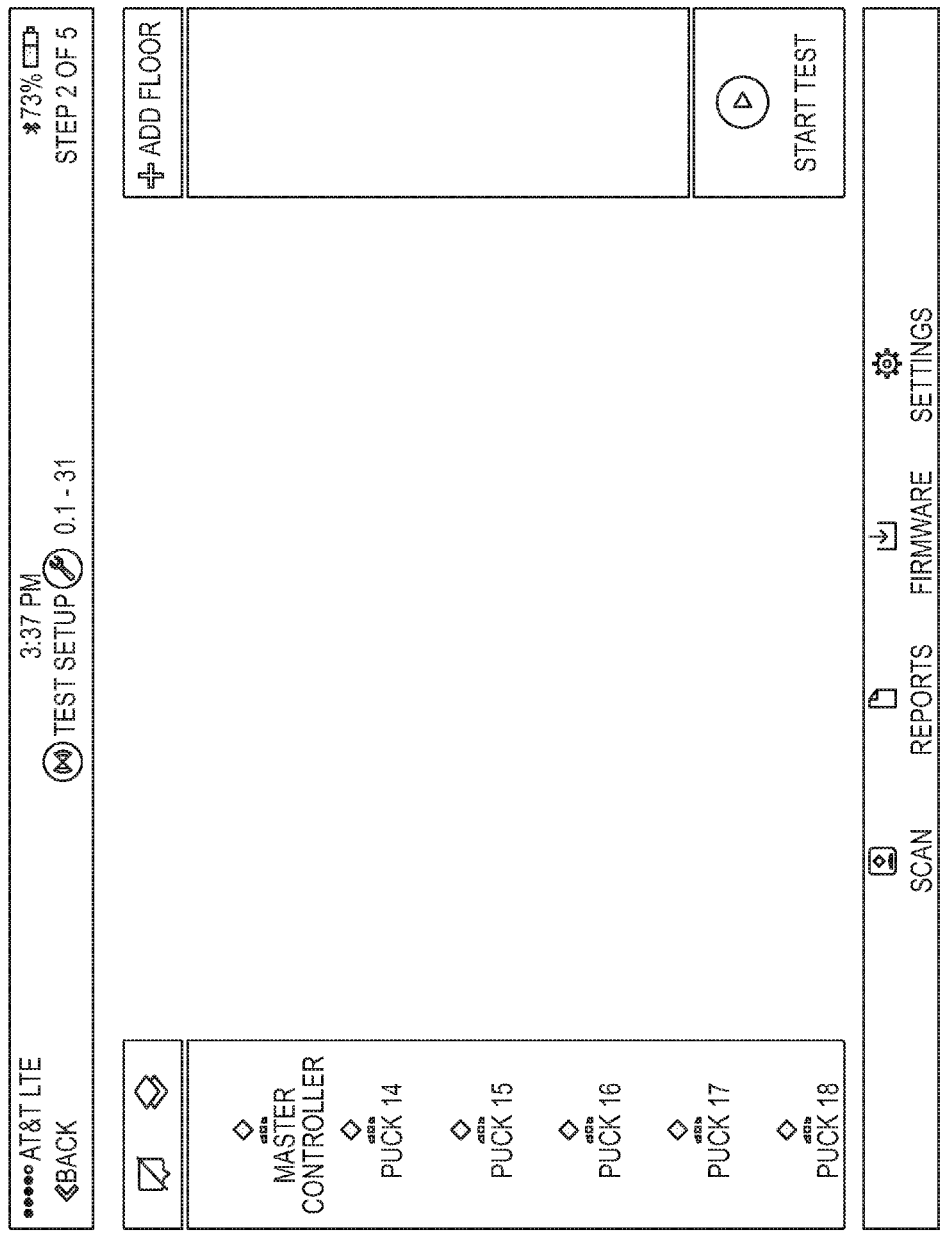
FIGS. 2-5 are depictions of a graphical user interface for floor layout design by a user according to one embodiment of the disclosed system and method.
Figure 3:
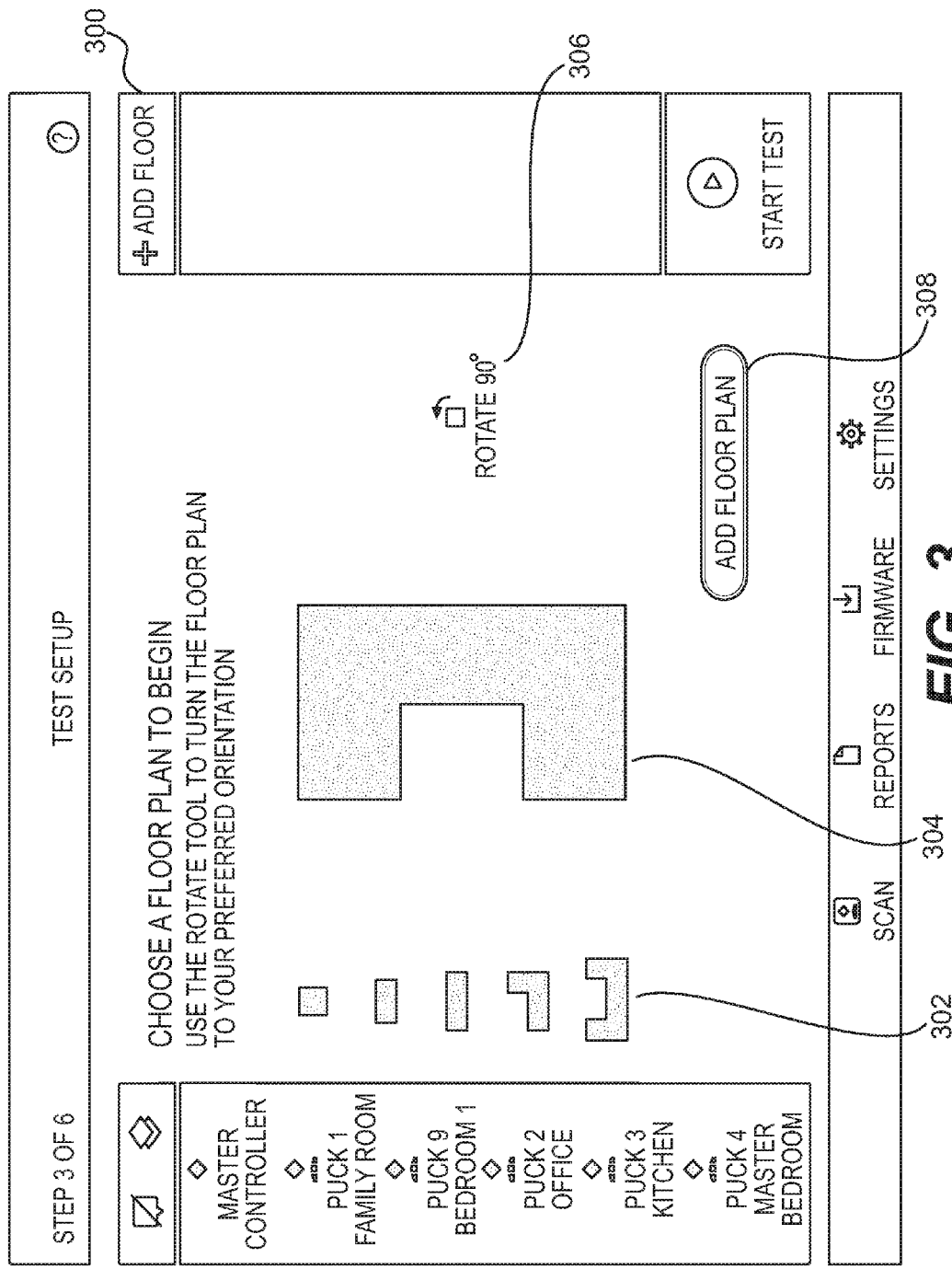
Figure 4:
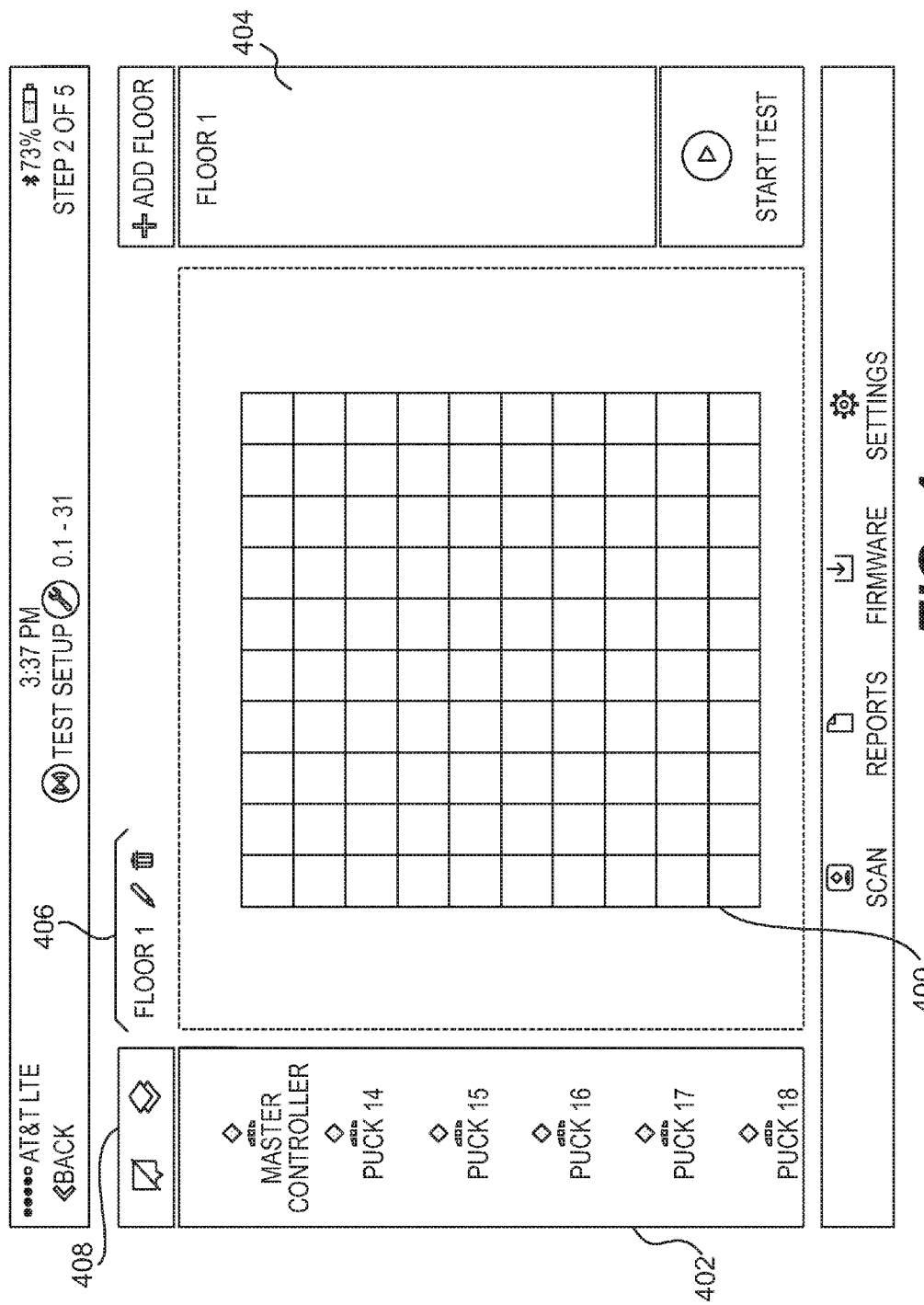

In one embodiment, the system implementing the method can provide a presentation on the display of a graphical user interface that includes an interactive graphical tool kit having tools for enabling a user to create an illustration of the floor layouts which once created provides the floor layout data sets to the system. One example of such a graphical user interface is shown in FIGS. 2-4. The graphical tool kit provides a variety of shapes and interactive elements to allow the user to denote the shape of the floor, the location of walls and other aspects of the structure and to place wireless communications equipment at desired locations within the structure. Referring to FIG. 3, an embodiment of a graphical user interface for creation of one or more floor layouts is depicted. A user may use selection button 300 to add an additional floor to the building profile. The user may select one or more shapes for the floor layout, which is then depicted in the graphical user interface as floor layout 304 to allow customization. Various functions for customizing the floor layout 304 may be provided such as rotation tool 306. Once a user has completed creating a floor layout, a button 308 may be provided to add the floor layout to a building profile.

FIG. 4 depicts an embodiment of a graphical user interface for a creating and modifying a floor layout 400. In some embodiments a selection 402 of wireless components may be added to the floor layout 400, such as master controllers and wireless test instruments, also called pucks, used to test and measure the performance of a wireless communications network. As floor layouts are added to a building profile, a list of floors such as list 404 may be depicted to allow a user to select and edit various floor layouts in the building profile. Various fields and tools 406 may be provided for modifying the shape or name, or deleting floor layouts from the building profile. In some embodiments, buttons or other graphical elements 408 may be provided to allow a user to switch between various views of the building profile, such as a three dimensional projection views or two dimensional planar views of the floors of the building profile.

In other embodiments, the floor layout for one or more floors can be imported in whole or in part into the system, and from which the floor data set can be developed. The process can include receiving a floor layout file representing the floor layout such as in the form of a PDF, WORD, TIFF, CAD or other data file. In some embodiments, a camera associated with the user device for the system and the GUI can be used to obtain an image or an image can be imported or searched and downloaded from a content service 106 or from a centralized resource manager 101. Once received, the floor layout file can be analyzed for the one or more floors and one or more floor layout data sets generated from such analysis. In embodiments in which an image of a structure, a room, a portion of a structure layout, etc. may be captured and/or imported, the image can be analyzed and floor layout features can be extracted from the image to define a floor layout. In some embodiments, a base data file or floor layout or building profile can be imported, stored or downloaded and the GUI can enable the user to modify the original layout for the particular arrangements.

In some embodiments, the GUI can be configured to enable further refinement and details of a floor layout such as the addition of furniture, cubicles, A/C systems and ducting, power systems, plumbing fixtures, appliances, material makeup of floors and walls and other features that may impact the operation of the wireless network. Further, distances on the floor layouts can be added. These floor layouts can be on a two dimensional basis reflecting only flat x-y positions in x-y coordinates either for each floor or within an x-y-z coordinate system for two or more floors or for the building. In other embodiments, the floor layout data sets and the floor layouts can include a z position or a vertical position within each floor and between floors.

Figure 5:
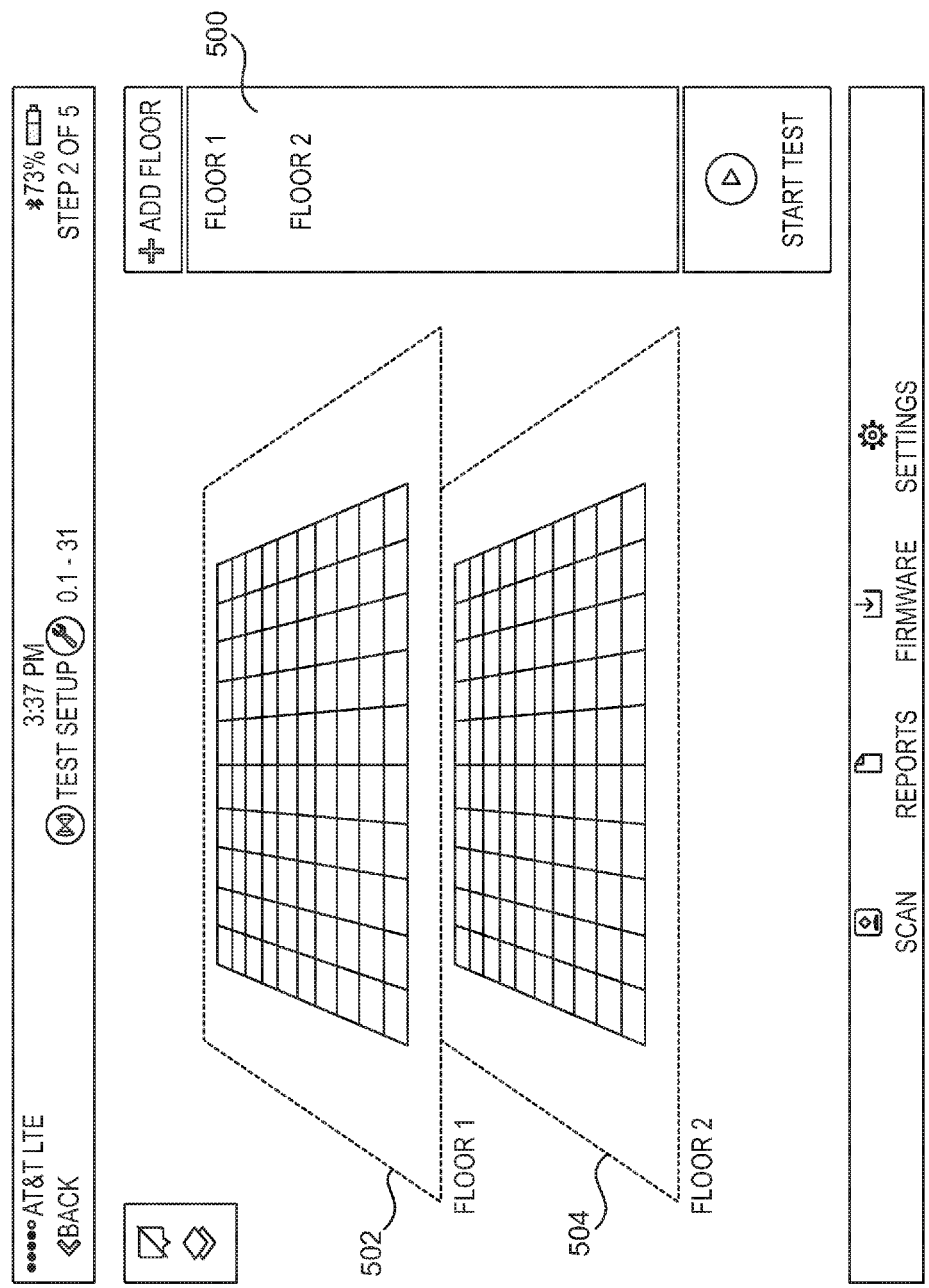

Referring now to FIG. 5, an embodiment of a graphical user interface for viewing and modifying multiple floor layouts in a 3 dimensional projection is depicted. The graphical user interface may be provided with a list 500 of the floors in the building profile. In the depicted embodiment, the floor layouts 502 and 504 are shown in a three dimensional projection. In other embodiments, the graphical user interface may depict an axonometric projection of the building layout or other similar types of projections used to depict a three dimensional object on a two dimensional graphical display.

Figure 6:
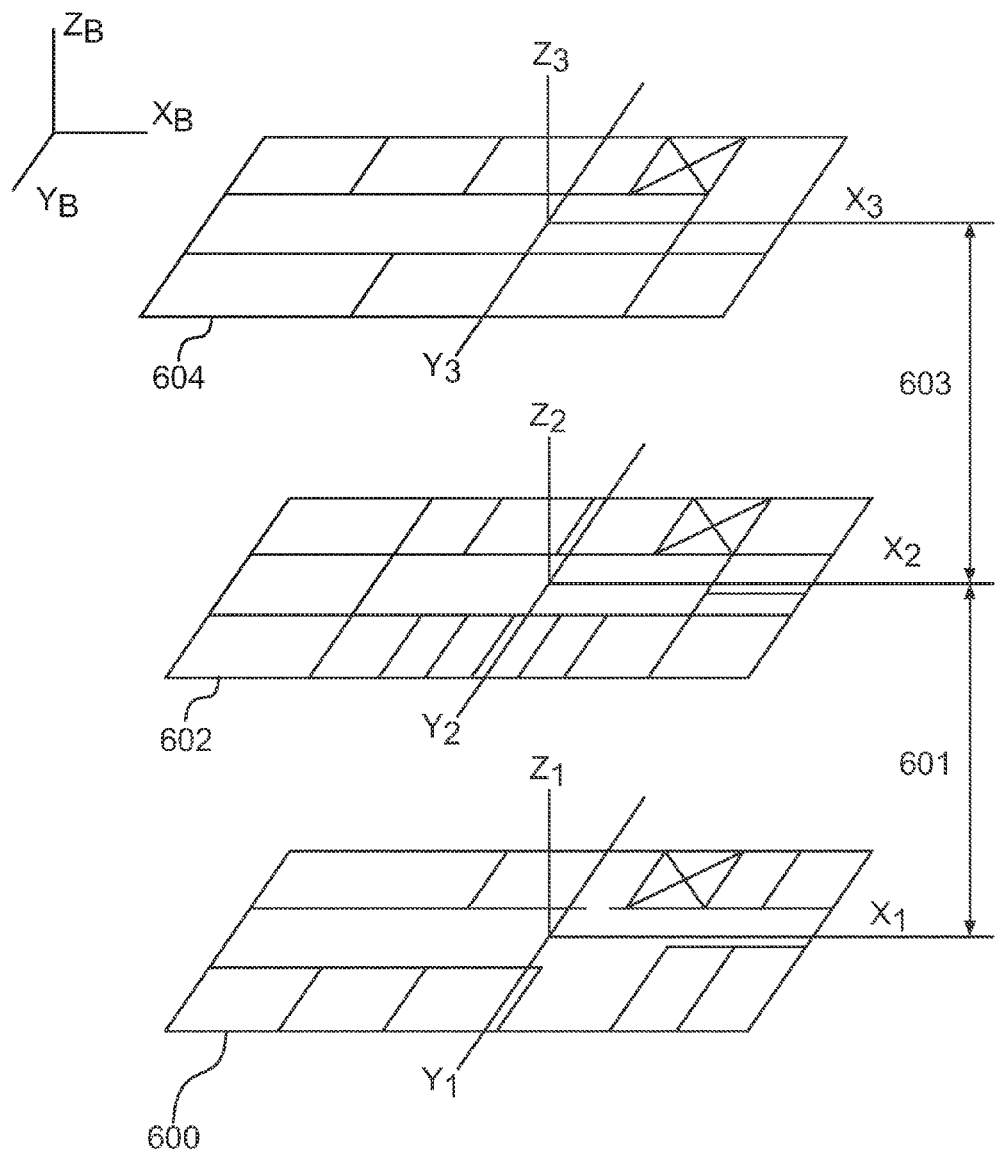
FIG. 6 is a three dimensional projection view of a displayed three floor layout building including floor and building coordinate systems according to one embodiment of the disclosed system and method.

In some embodiments of the system, in generating a three dimensional graphic illustration of the building on the GUI, the system can include aligning each of a plurality of floor layouts relative to the other floor layouts by aligning each floor's coordinate system with the other floor's coordinate systems, within a common z axis or within a 3D coordinate system for the building. Each floor 2D or 3D coordinate system can be defined relative to or within the building 3D coordinate system or a premises coordinate system. Referring now to FIG. 6, a view of three floor layouts 600, 602 and 604 are depicted in a three dimensional project, each having x, y and z axes. Each floor layout depicts the various walls and other structural elements located on each floor. The z axes, $Z_1$, $Z_2$, and $Z_3$ may be aligned to correctly align the structures on each floor layout with those on the other floor layouts. The system may receive and store the distances 601 and 603 between the floors in the actual building to space the floor layouts 600, 602 and 604 in the three dimensional projection in proportion to the actual physical spacing of the floors.

In some embodiments, the floor layout data sets are planar 2D data sets in which case the three dimensional graphic illustration of the building is generated illustrating an parallel projection of the planar upper floor layouts above the planar lower floor layouts in a visually spaced apart relationship, but not actually to scale. A relative distance between the floors can be provided in some embodiments such as where a vertical floor spacing distance, such as 601 and 603, between the various floor layouts is received with the floor layout data set. In these embodiments, the generating of the three dimensional graphic illustration of the building includes the spaced apart relationship scaled to the received vertical floor spacing 601 and 603.

In some embodiments, the method further includes receiving a location of one or more wireless network device on at least one of the floor layouts. In these embodiments, a plurality of such devices may be placed on one or more of the floor layouts. Each of the wireless network devices placed on the floor layouts can be any type of wireless network transceiver (by way of example, a device compatible with Wi-Fi) and can include, but are not limited to, a wireless network router, a wireless network gateway, a wireless network access point, a wireless network antenna, a wireless network repeater, a wireless network range extender, a wireless network antenna, or any other device that utilizes a wireless network. In some embodiments, these devices can be actual user devices, but in other embodiments, the devices can be virtual devices selected for modeling purposes, or can be wireless testing devices, such as wireless instruments, placed within the building for testing and designing of the wireless network. In one example, a first wireless network device can be a wireless network master controller and one or more second wireless network devices can be a wireless network test device or puck, or repeater or range-extender. The wireless master controller and the wireless network test devices can be components of a distributed wireless network testing system.

Figure 7:
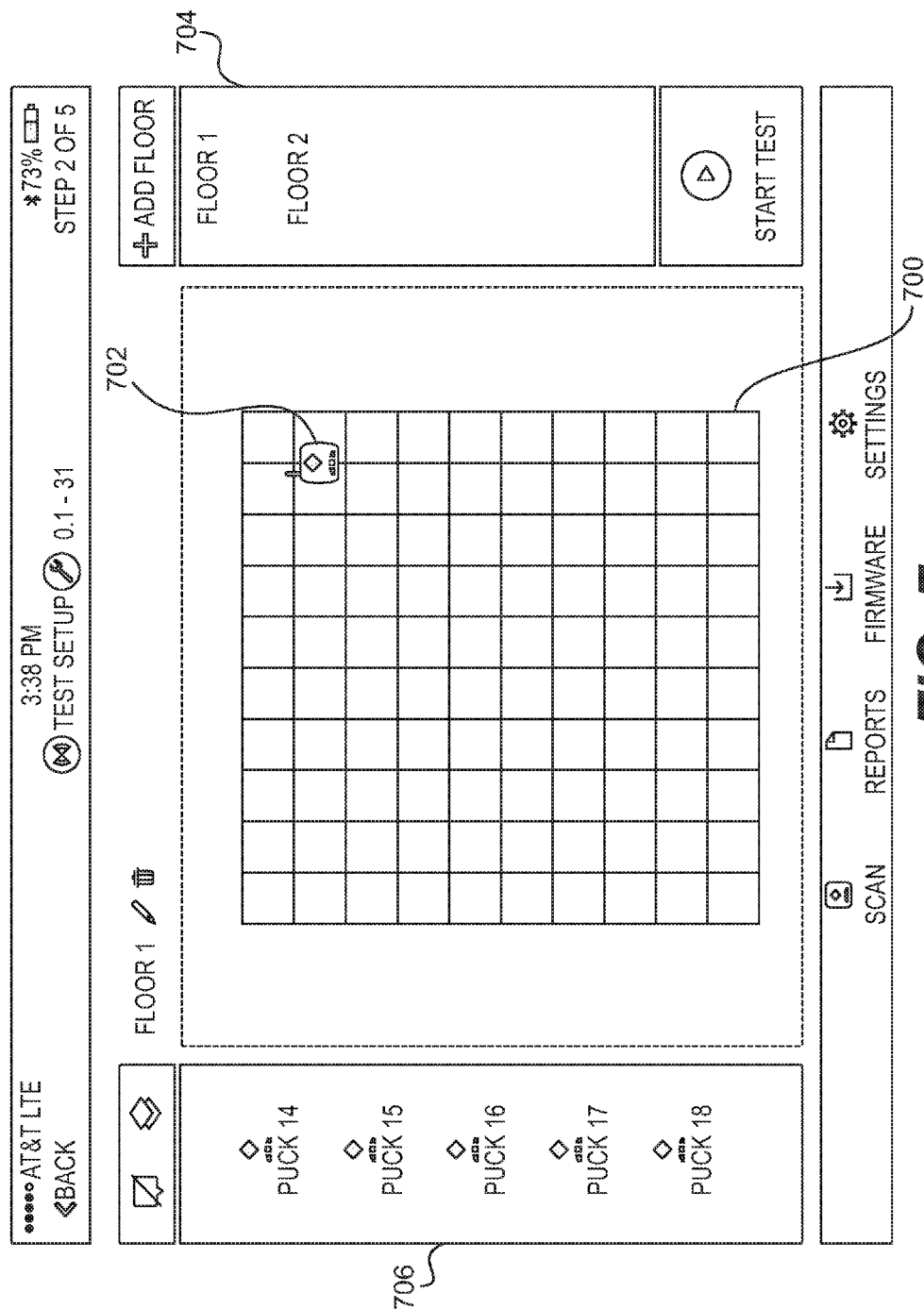
FIGS. 7-12 are depictions of a graphical user interface for defining or locating a wireless network device on a floor layout according to one embodiment of the disclosed system and method.
Figure 8:
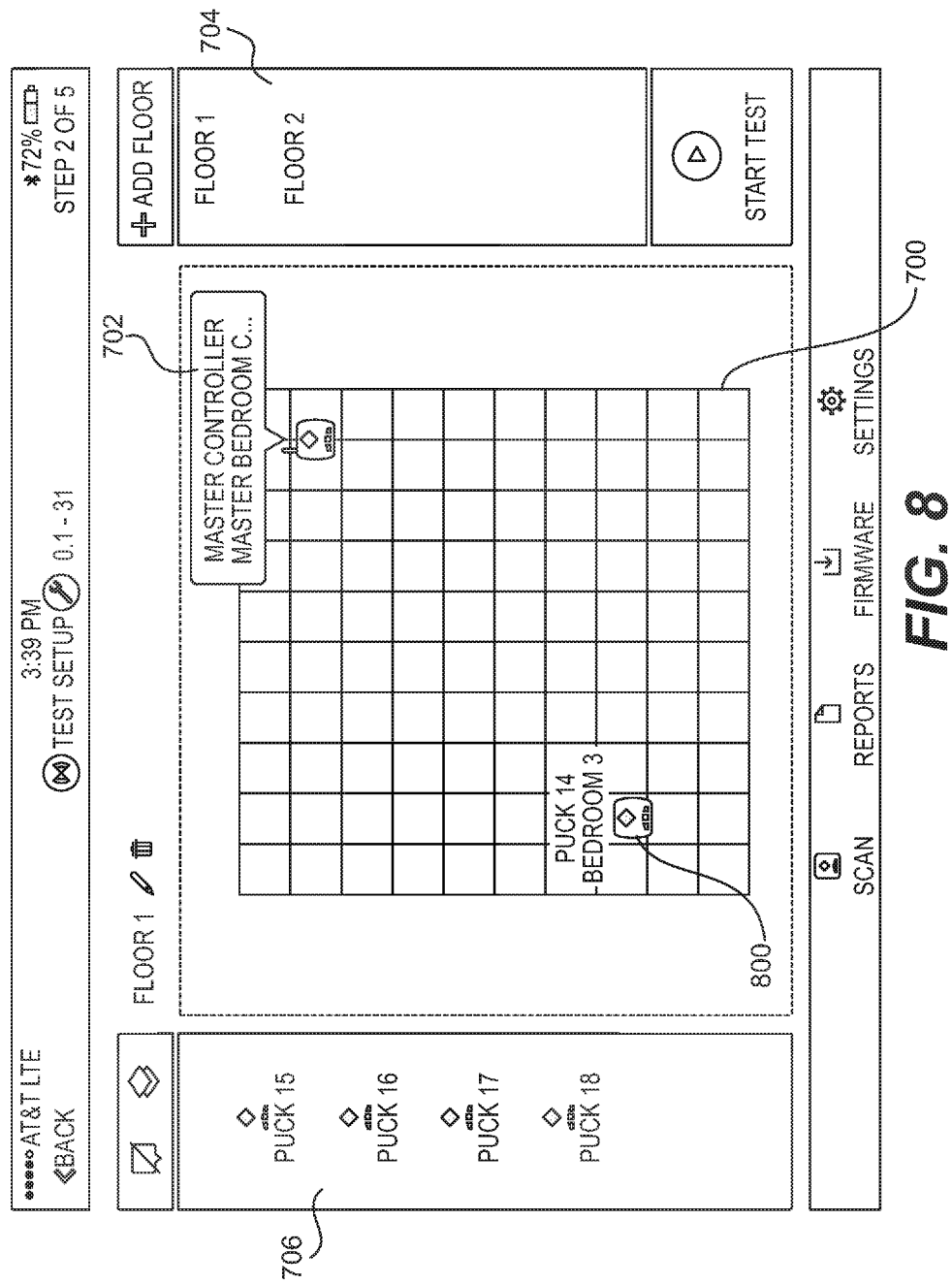
Figure 9:
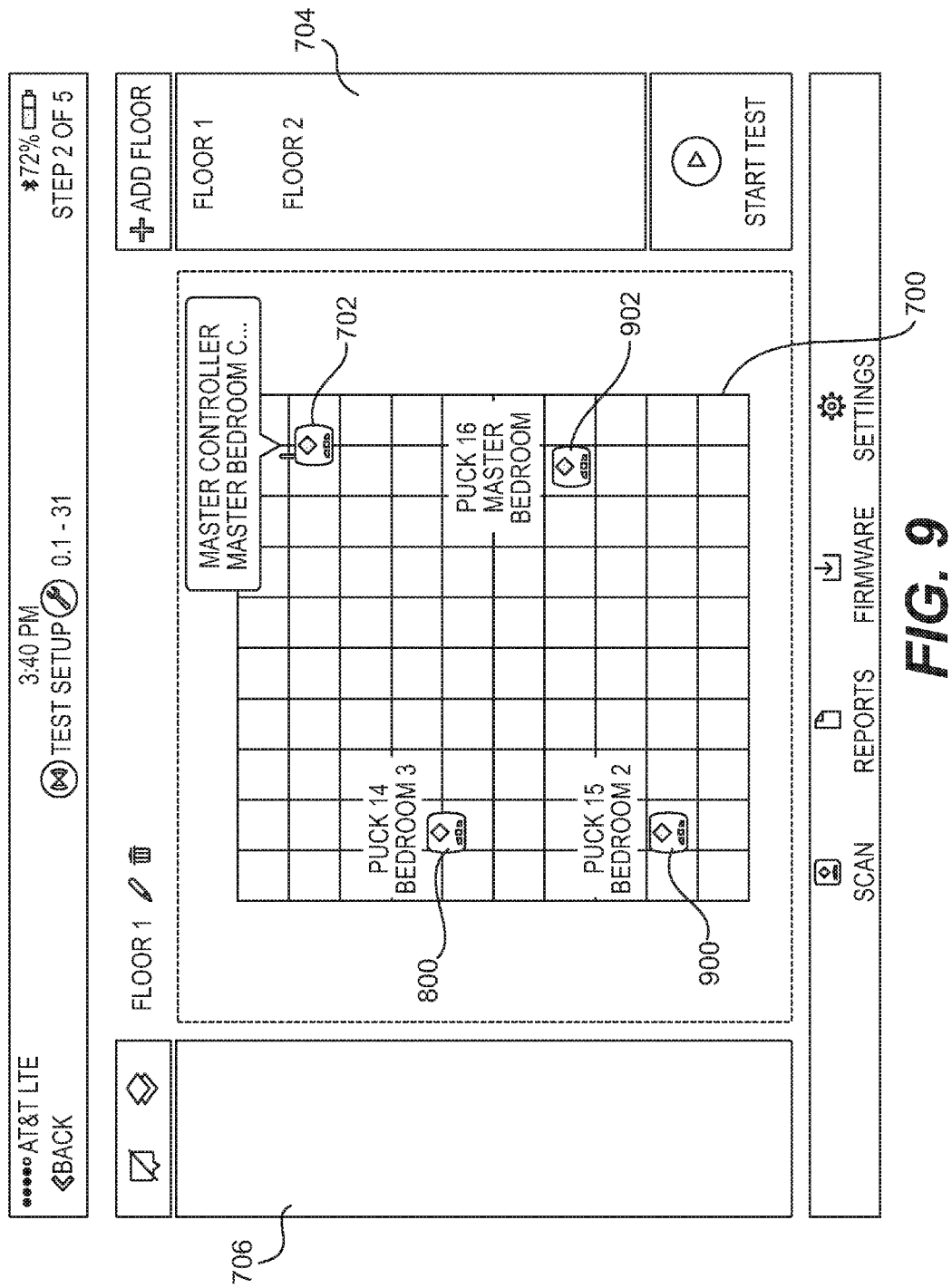
Figure 10:
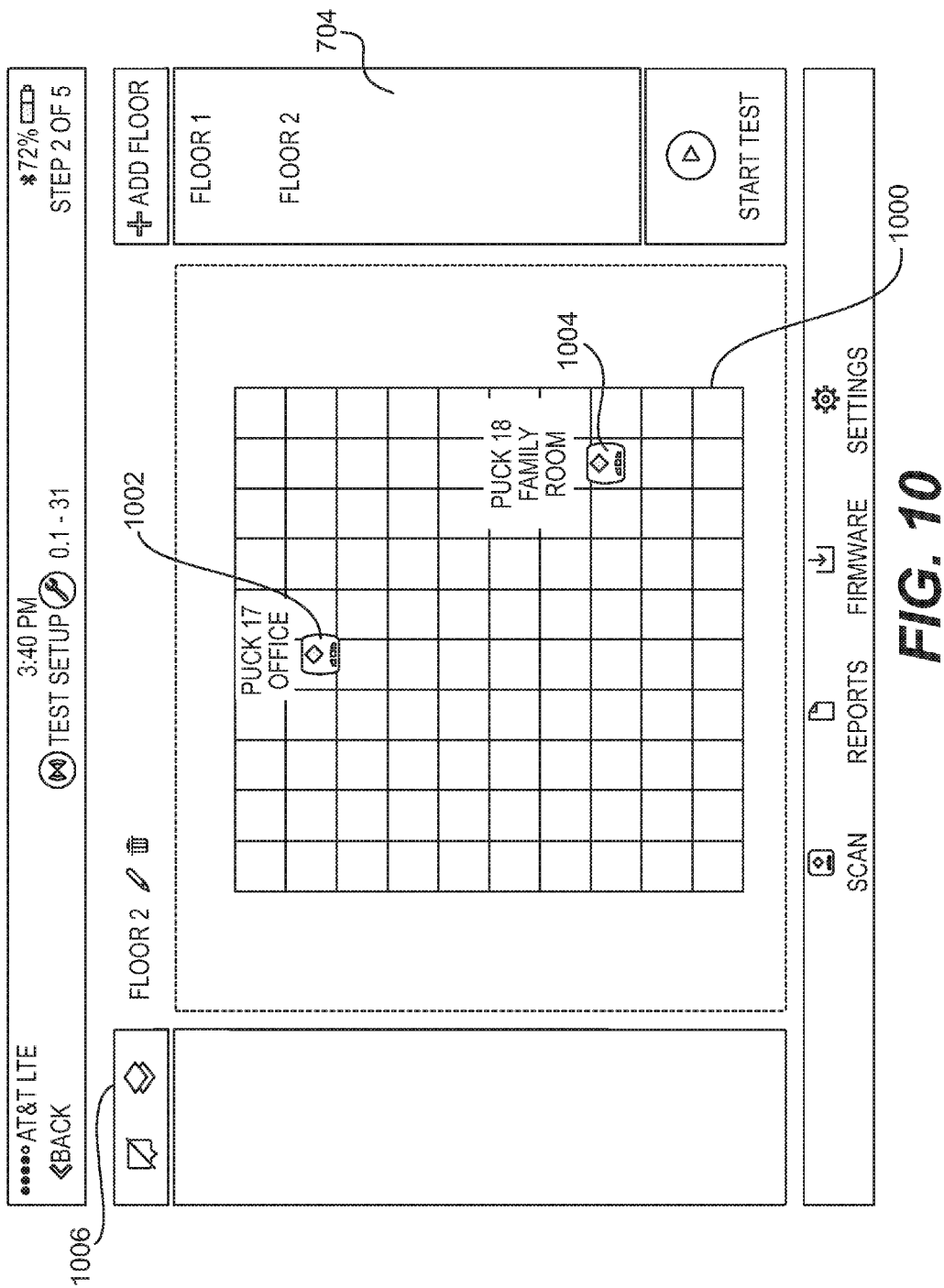

The placement or location of each wireless network device on the floor layout can be by any suitable means and can include placement via the graphical user interface. Referring now to FIG. 7, in some embodiments the graphical user interface may enable the user to specify the location of the wireless network device on the each floor layout 700. The user may select one of the floor layouts from list 704, causing the floor layout 700 for that floor to be displayed for modification. In the depicted embodiment, the user may select wireless devices from list 706 and place one or more such devices on the floor layout 700. The wireless network devices may be depicted on floor layout 700 by one or more icons 702. The icons 702 may be added to, moved on and deleted from the floor layout 700. Referring now to FIGS. 8 and 9, depictions of the graphical user interface of FIG. 7 are shown with additional wireless network devices 800, 900, and 902 depicted on the floor layout 700. The various wireless devices 800, 900, and 902 for example, may be renamed to correspond to the location of the network device in the actual building, such as "MASTER BEDROOM", "BEDROOM 2", or "BEDROOM 3" for example. In FIG. 10, an additional depiction of the GUI of FIG. 7 is provided. In FIG. 10, a different floor has been selected from list 704 causing a different floor layout 1000 to be displayed on the graphical user interface with different wireless devices 1002 and 1004.

Figure 11:
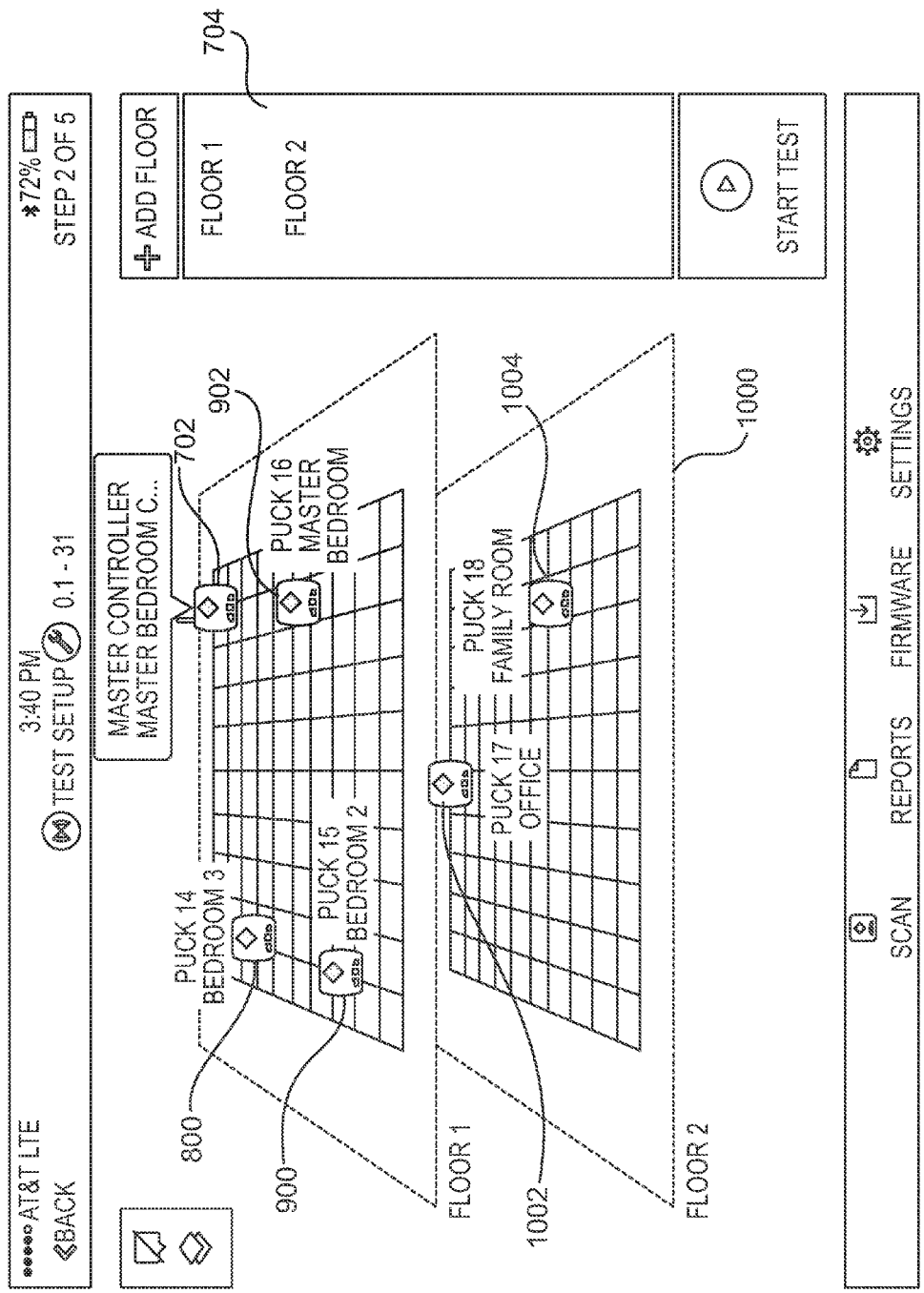
Figure 12:
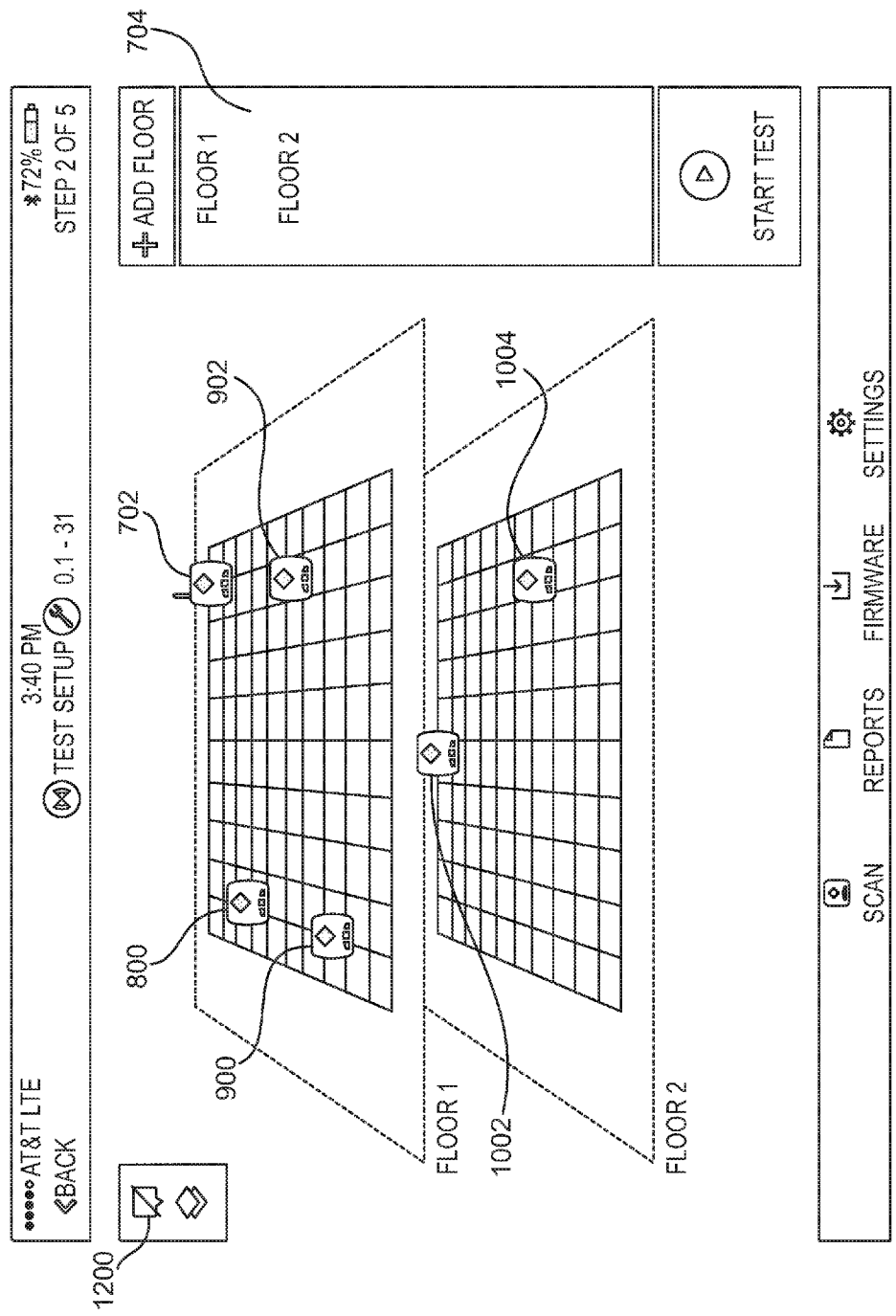

The wireless devices may be displayed in a three dimensional projection view by selecting the appropriate options, such as button 1006 shown on FIG. 10. Referring now to FIG. 11, such a three dimensional projection view showing a plurality of floor layouts is provided. In some embodiments, such as shown in FIG. 12, a button 1200 may be provided to turn labels on the various elements on or off.

Referring now to FIG. 13, a top plan view of a floor layout of a floor of a building according to an embodiment of the disclosed system and method is depicted. In some embodiments of the disclosed method, the system may provide tools to a user to create a detailed floor layout 1310, including walls 1324 and various items of furniture 1312 at their various locations within the house. The wireless network in the depicted structure may include a wireless network gateway 1322 that provides wireless network services to the depicted building, and a variety of wireless devices 1325 that access the wireless network and utilized the network gateway 1322 to receive data. In order to test and maximize the performance of the network gateway 1322 and of devices 1325, a test network system may be implemented in the structure to gather data regarding the performance of the network gateway 1322 and devices 1325.

The test network is described in more detail in U.S. patent application Ser. No. 14/506,106. It may include a master controller 1328, at least one wireless instrument 1326, and a graphical user interface 1329. In some embodiments of the test solution, a user operates graphical user interface 1329 to send commands to the master controller 1328, which in turn sends commands to wireless instruments 1326. In some embodiments, the "START TEST" button shown in the graphical user interface in FIG. 12 may be utilized to initiate a network test. In some embodiments of this test system, the master controller 1326 acts as a wireless network gateway or access point and provides wireless network services to wireless instruments 1326. In some embodiments, the master controller is placed near the network gateway 1322 so as to closely emulate its performance. In other embodiments, the master controller 1328 may be placed at a desired location for a network gateway 1322, whether or not a network gateway has been installed at that location or not. In addition to providing wireless networking services, master controller 1326 and wireless instruments 1326 are specially designed to perform specific functions to test the wireless network and collect performance data values relating to the wireless network performance parameters.

In response to commands from graphical user interface 1329, the master controller 1328 and wireless instruments 1326 may emulate users of the wireless network gateway 1322 by devices 1325. This may include emulating various types of wireless network activity, such as downloading of video or other types of data, and it may also include measuring various performance parameters for a wireless network such as signal strength. Reference is made to U.S. patent application Ser. No. 14/506,106 for more particulars regarding the operation of the test system depicted in FIG. 13. In some embodiments, the results of wireless tests performed by master controller 1328 and wireless instruments 1326 may be stored by the system and associated with a floor layout for the building. This performance data may depicted in a graphical user interface by varying embodiments of the system as described herein.

Figure 14:
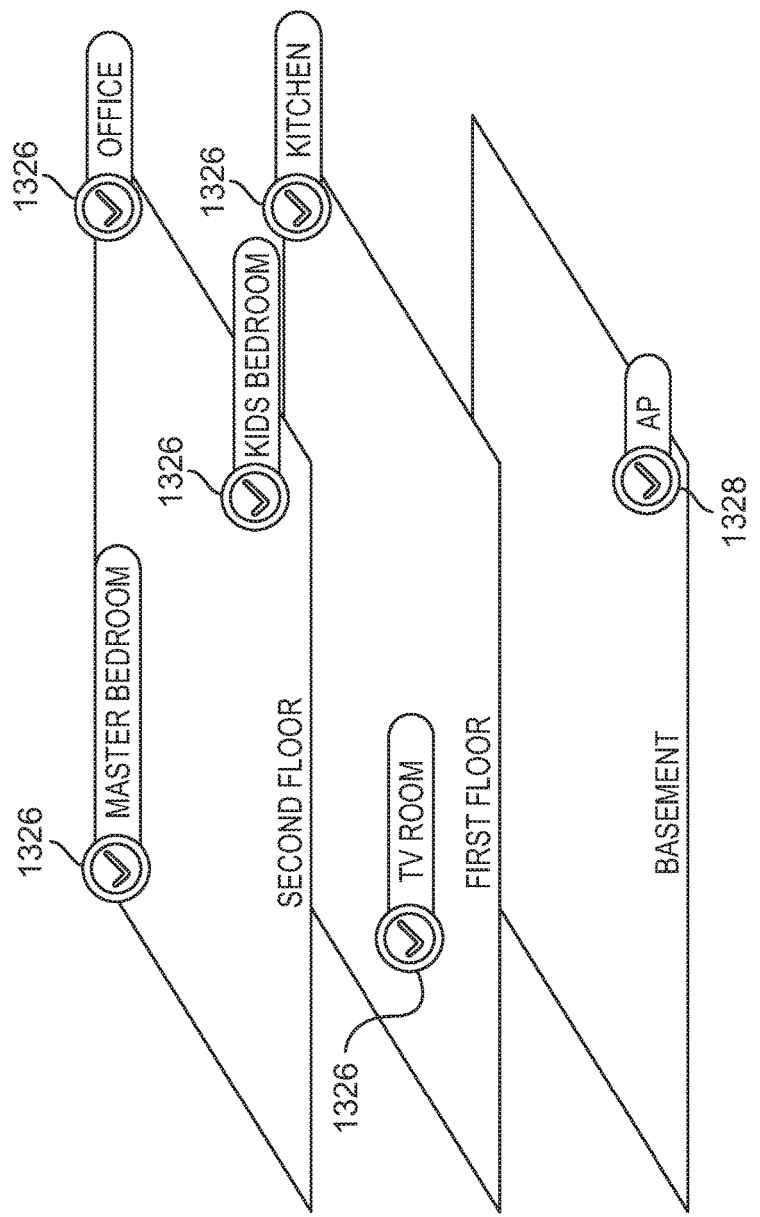
FIG. 14 is a depiction of a three dimensional projection of a building profile having three floor layouts and identifying and labeling wireless network devices on each of the three floor layouts according to one embodiment of the disclosed system and method.

Referring now to FIG. 14, a three dimensional projection view of a building profile of a building with three floors is depicted in an embodiment of the disclosed system and method. In some embodiments, the graphical user interface 1329 may provide a view such as that shown in FIG. 14 to depict the operation of the test system shown in FIG. 13. In the example shown in FIG. 14, the building profile for the building contains three floors, each with its own floor layout labeled as "BASEMENT", "FIRST FLOOR", and "SECOND FLOOR". In the depicted embodiment, the location of the master controller 1328 is depicted and labeled as "AP", and the location of each wireless instrument 1326 are also depicted and may have a label displayed in conjunction with the icon for the instrument 1326. The icon depicting the location of each controller 1329 or instrument 1326 may also include an indicator of the status of depicted device, such as a checkmark to indicate an operational status or to indicate other aspects of the performance or operation of the test system. In some embodiments, the network gateway 1322 and wireless devices 1325 may be located and depicted on the floor layouts for the various floors of the building profile.

In some embodiments, the graphical user interface enables the user to create, label or define one or more of the wireless network devices 1325 or instruments 1326 by providing a location name, a device name, a type, a model, and a technical parameter for each wireless network device. In some embodiments, the system and method can have predefined device profiles stored or accessible for downloading from content services 106, CRS 101 or other network resources. These device profiles can provide further details with regard to the particular wireless network device. Examples can include a device type, a model and or serial number of the device, and one or more technical parameters for the device. If available, the graphical user interface may enable the user to select the device profile for the wireless network device from among a stored group or a list such as via a pull down menu, or to search locally or remotely for a device profile for the device.

In some embodiments, the system and method includes receiving one or more wireless performance data sets measured by a wireless instrument 1326 on a floor, each data set having wireless network performance data values for a wireless network performance parameter of the wireless instrument 1326. In some embodiments a plurality of data sets are received. As should be understood to those of skill in the art upon reading this disclosure, the wireless network performance data sets, and data values contained therein can be one or a combination of wireless network parameters such as a radio frequency signal strength for one or more radio frequencies or frequency bands, a power value, a frequency value, a polarization value, a phase shift value, a modulation value, a protocol value, a signal to noise ratio (SNR) value, a signal-to-interference-plus-noise ratio (SINR) value, a received signal strength indicator (RSSI) value; a bandwidth value, a time delay value, a congestion value, an interface standard value, and application level performance metrics such as a quality of service (QoS) or quality of experience (QoE) metrics such as for video streaming, audio streaming, gaming, and web browsing applications.

In various embodiments of the system and method, the measurements of wireless network performance parameters are processed by one or more of the wireless instrument 1326, master controller 1329, user interface 1329, CRM 101, LRM 103, or some combination thereof to generate the wireless network performance data values. In some embodiments, the master controller 1328 receives unprocessed measurements from the wireless instruments 1326 regarding one or more wireless network performance parameters, and processes the measurements to generate one or more wireless performance data values. The wireless network performance data values may be transmitted by the master controller 1326 to the user interface device 1329, CRM 101, a content server 106, or some other local or remote resource for storage or optional further processing. In some embodiments, the wireless instruments 1326 process the measurements of various wireless network performance parameters to generate wireless network performance data values before transmitting the data values to the master controller 1328. In some embodiments, the measurements of various wireless network performance parameters may be transmitted to the user interface 1329, CRS 101, LRM 103, or content servers 106 with or without being processed. In various embodiments, initial or additional processing of the measurements of wireless network performance parameters may be performed by any of the computing devices that measure, transmit, receive or store the measurements or the wireless network performance data values.

In some embodiments, the measurements, and the wireless network performance parameters generated from the measurements, may be processed by scaling, weighting, combining or otherwise modifying the data to generate additional data values representative of wireless network performance. For example, in one embodiment a wireless instrument 1326 measures a congestion value, an interference value, a signal strength value, and an application metric value. In the exemplary embodiment, the measured values are then processed, by one or more devices as described above, by applying a scale factor to generate scaled values. In some embodiments, the scaled values are then processed by applying a weighting factor to generate weighted values. In some embodiments the weighted values may then be combined to generate a QoE value. An exemplary formula for calculating a QoE value in the exemplary embodiment may be expressed as QoE=Wcongestion*Scongestion+Winterference*Sinterference+Wsignal*Ssignal+Wapplication*Sapplication where W represents the weight for each performance parameter and S represents the scaled value of the measured parameter. The QoE value may then be stored and used with similar QoE values generated from measurements from the same or other wireless instrument 1326 to generate a wireless network performance image.

In some embodiments, the method and system generate a wireless network performance image on the three dimensional graphic illustration of the building profile including a graphical representation of the wireless performance data values contained in the data sets relative to the floor layout for which those data sets were collected. In the embodiments wherein only one data set is received, only one set of performance data values can be included in the generated three dimensional graphic illustrations for only one of the floor layouts. However, if more than one data set is received, then data values from each data set may be included in the three dimensional graphic illustration. Each data value may be associated with a particular location on a floor layout using the floor coordinate system or building coordinate system, thus each data set may contain data values that represent the value of a parameter at a plurality of locations on the floor of the building. These data values may be actual measured values or generated values calculated by numerical analysis such as extrapolation, interpolation, or simulation.

Figure 15:
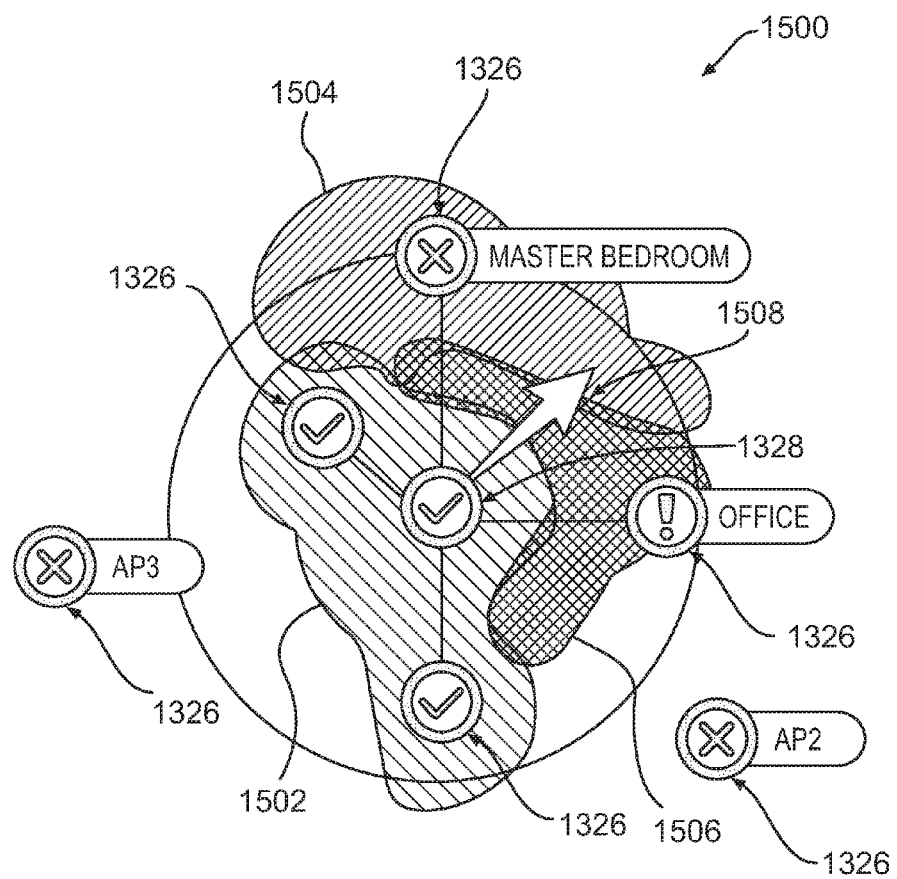
FIGS. 15-21 are depictions of graphical user interfaces for displaying system performance data of a wireless network according to one embodiment of the disclosed system and method.

Referring now to FIG. 15, a two dimensional graphical illustration 1500 of the wireless network performance data values for a floor layout in an embodiment of the system and method disclosed herein is depicted. The master controller 1328 and the various wireless instruments 1326 used in the test are depicted on the illustration. Each of the forgoing may include a label to identify the location of the device. In some embodiments, the icon of the devices may also include an indicator of the status of the device or an aspect of its performance. In some embodiments, an "X" icon may indicate that the device is inactive or is not receiving services from the controller 1328, an exclamation point may indicate that the device is not receiving acceptable levels of service, and a check mark may indicate that the device is receiving adequate service from the controller 1328.

In the embodiment depicted in FIG. 15, the graphic illustration displays a variety of color-coded or shaded areas 1502, 1504, and 1506 that may indicate the measured, processed, or simulated values of various parameters of performance from the network performance data set. In some embodiments, the color-coding comprises a heat map illustration of wireless network performance data. In the example depicted in FIG. 15, area 1502 depicts an area of acceptable wireless network performance offered by controller 1328, and in some embodiments may be colored green. Similarly, area 1508 depicts an area of reduced performance and may be colored yellow, and area 1504 depicts an area of unacceptable service and may be colored red. Other areas outside of the shaded areas may indicate a lack of service by a network gateway 1328 at the depicted location. In some embodiments, the assignment of a color, shading, or other graphical attribute to a value of a parameter of performance comprises comparing the data value to a series of thresholds or ranges for values to be assigned to each level. For example, a data value above a first threshold may comprise an "acceptable" level of service, while a data value within a certain range (e.g. less than the first threshold but greater than a second threshold) may comprise a "reduced" level of service, and a data value below the second threshold may comprise an "unacceptable" level of service. Depending on the selected performance parameter a lower value may comprise "acceptable" instead of a higher value, and there may be any number of threshold values and ranges of service levels across the spectrum of values for the parameter. One example of such threshold values and ranges is described below with regard to 4K HD streaming video.

In some embodiments, an arrow 1508 or other indicator may be provided to suggest possible relocation of the network gateway 1322 from the position of master controller 1328 to increase the service provided to the wireless devices using the network. In the depicted embodiment, the arrow 1508 indicates that if the network gateway is moved upwardly and to the right on the depicted floor layout, the overall performance of the wireless network for the various wireless instruments 1326 may be improved. In various embodiments, different numbers of performance categories or levels may be utilized to generate the wireless network performance image.

Figure 16:
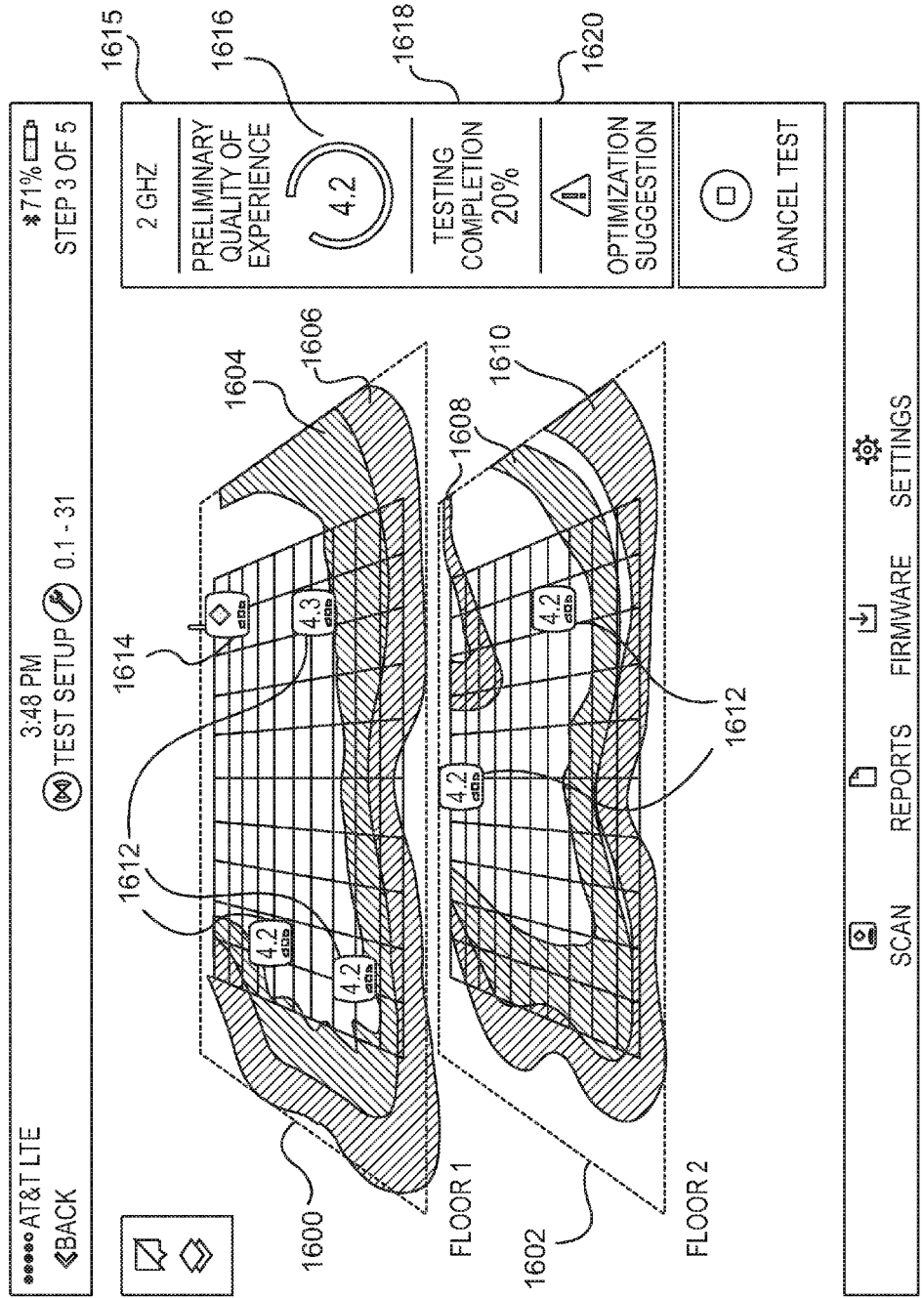

Referring now to FIG. 16, a depiction of an embodiment of a graphical user interface for displaying a three dimensional projection of multiple floor layouts with performance data shown on each floor layout is shown. In some embodiments the three dimensional projection may be an axonometric projection such as an isometric projection. In this example the building profile has two floor layouts 1600 and 1602 shown in relation to each other. In some embodiments, the floor layouts may have a heat map, a boundary map, or color-coded or shaded areas 1604, 1606, 1608, and 1610 on each layout to reflect one or more performance data sets gathered by the system during testing of a particular wireless network. The various areas 1604, 1606, 1608, and 1610 may indicate whether performance of the network within a given area is acceptable, unacceptable or non-existent. In some embodiments, the color or shading may represent data values or ranges of data values for a specific test executed by the testing solution. In some embodiments, the user of the graphical user interface may select different data sets to display on the display from, for example, different measurement parameters of the testing system.

The location of the master controller/network gateway 1614 and various test instruments/network devices 1612 may be depicted on the three dimensional projection of the floor layouts. In some embodiments, the icon for each wireless device 1612 may incorporate an indicator of the wireless performance at that location, such as a check mark, "X", or a numeric indicator such as shown in FIG. 16. In the depicted embodiment, the graphical user interface may be provided with various information such as textual descriptions 1615 of the displayed data, graphical or numerical elements 1616 to convey performance information regarding the performance of the wireless network, textual or graphical information 1618 regarding the progress of testing of the network, or buttons or icons 1620 regarding suggestions to optimize performance of the network.

In some embodiments, the graphical user interface enables the user to modify the generation of the wireless network performance image on the three dimensional graphic illustration of the building by selectively removing or modifying the graphical representation of at one or more of the wireless network performance data values. For example, even though the wireless network performance data is received and illustrated for one or more devices on one or more floors, the user can select a subset of that data such as a subset of devices or only one or a select few of the floors. In other embodiments, the GUI enables selection of a cross-section of the illustrated floors in the X or Y planes of the mapped or overlaid wireless network performance data and the floor layouts or view a particular layer in the z axis in order to better visual the wireless network performance image in a particular plane of interest.

Figure 17:
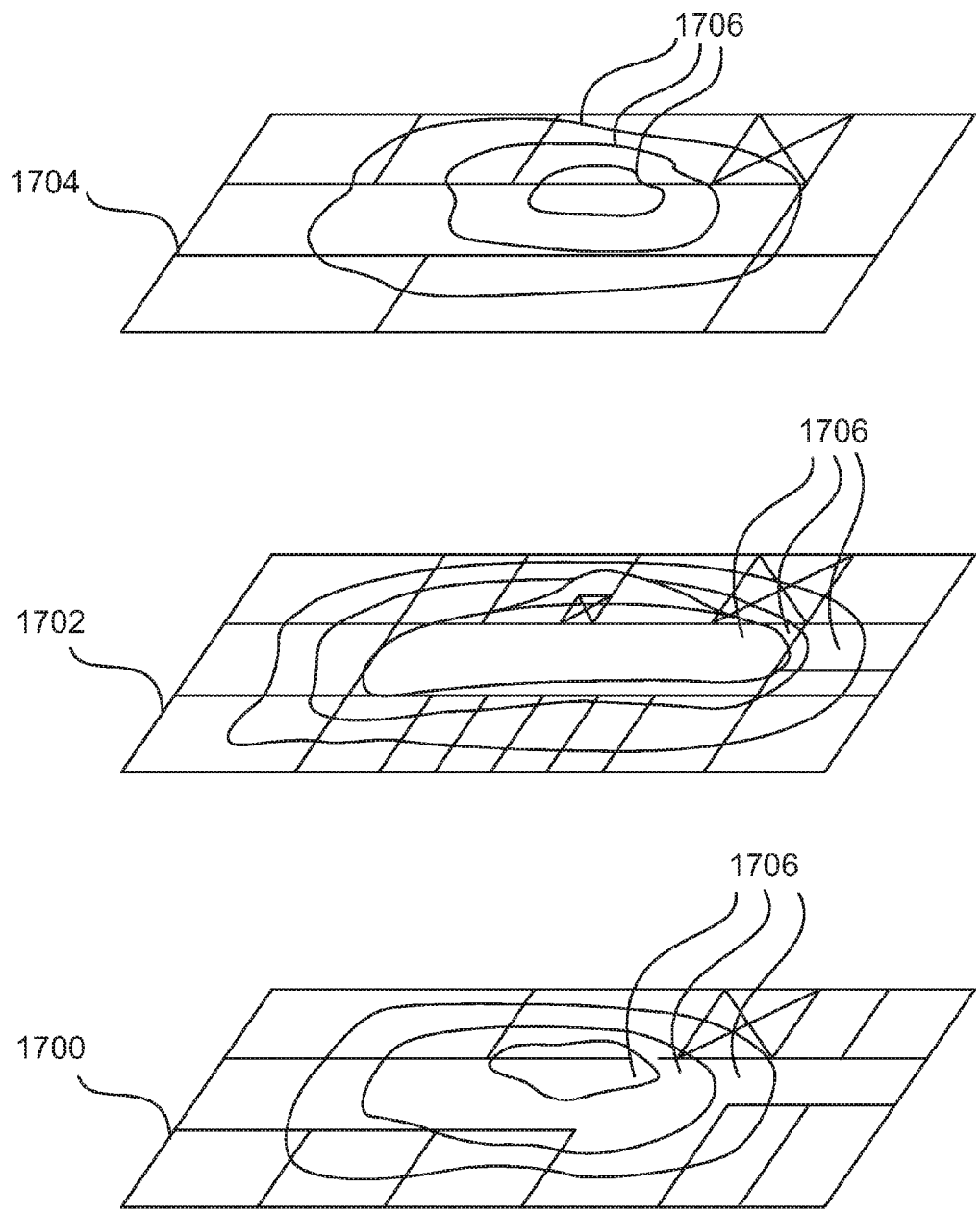

In some embodiments, the system and method further may include the wireless network performance data set having wireless network performance data values that are defined within one or more floor coordinate systems or the building coordinate system. Data sets using a building coordinate system may be mapped to each floor layout in the building profile, including layouts for floors other than that on which the network gateway is disposed, since wireless network devices have varying performance levels and values in the vertical direction as well as the x-y directions. In some embodiments, such wireless network performance data values may be defined within one of the floor coordinate systems or may include for each wireless network performance data value within the data sets a floor or building position identifier x, y or x, y, z within one or more of the applicable coordinate systems. In some embodiments of the floor layout data sets are three dimensional data sets, and the generated three dimensional graphic illustration of the building can be an isometric model of the multiple floor layouts such as depicted in FIG. 17, which depicts a three dimensional projection of the floor layouts 1700, 1702, and 1704. In the depicted embodiment, the projection is an isometric projection. In such a case, the wireless network performance data set for one or more wireless network devices on one floor layout 1702 may include values that are displayed on another floor layout 1700 or 1704. The wireless network performance data may be displayed using color coding, shading or line boundaries 1706 between various levels of performance.

Figure 19:
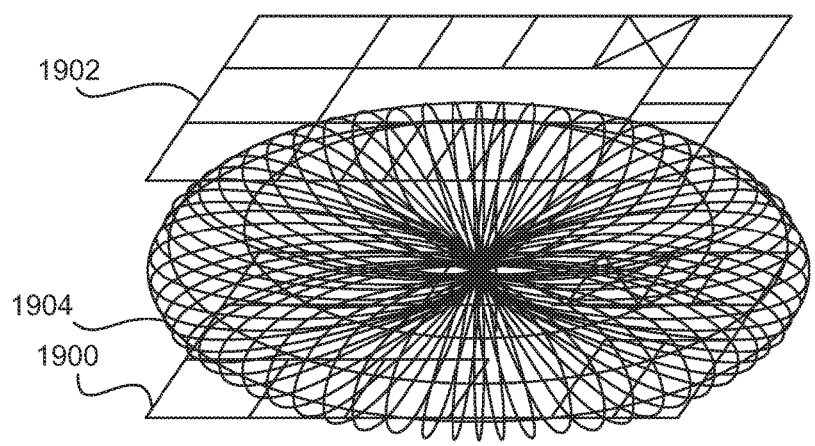
Figure 20:
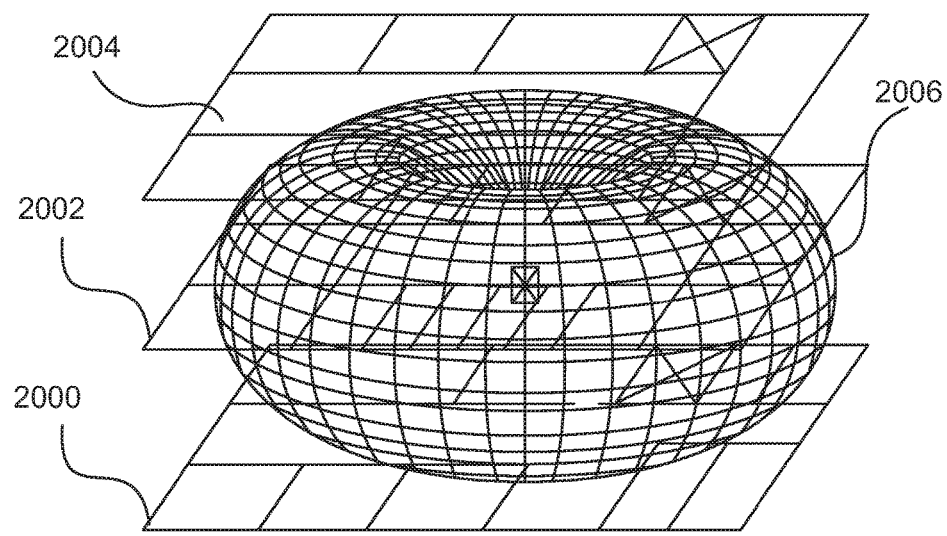
Figure 21:
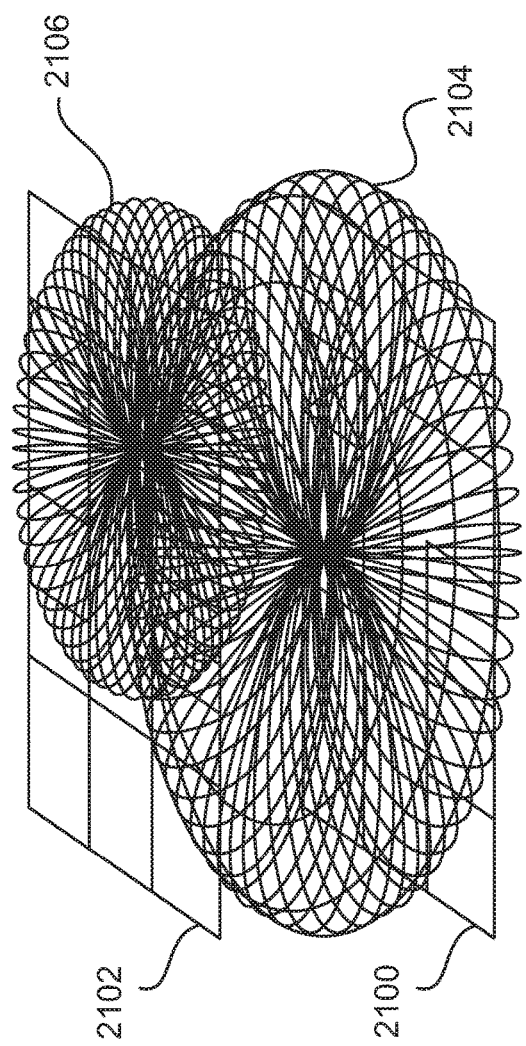

The generation of the wireless network system performance image can include any suitable means for enabling the user to visual the performance data for ease of use and design of the wireless network and locations of the wireless network devices. In some embodiments, this can include a superimposition or overlaying of a wire frame mapping of the wireless network performance values onto the displayed floor layouts, as may be seen in FIGS. 19, 20, and 21. FIGS. 19 and 20 depict the performance of a single wireless network gateway across multiple floors of a building. In FIG. 19, wire frame shape 1904 depicts the extent of some parameter of a single wireless network device extending across floor layouts 1900 and 1902. Similarly in FIG. 20, wire frame shape 2006 depicts the extent of a parameter of a wireless network device across floor layouts 2000, 2002, and 2004. FIG. 21 depicts the performance of multiple wireless devices via wire frames 2104 and 2106 on multiple floor layouts 2100 and 2102 of a building profile. In other embodiments, this can include an identification of the values or boundaries for various levels of the performance data as may be determined and stored within the system, such as in FIG. 18. In other embodiments, the wireless network performance data values can be allocated to groups and allocated colors or otherwise color coded, mapped or otherwise divided to provide a visual indication of the relative wireless network performances across a section of the floor layout for one or more floors. In one embodiment, this can be in the form of generating a heat map from the received wireless network performance data set. Such a heat map can be generated on a per floor basis, or can be generated across multiple floors or vertically within one or more illustrated floors.

As one example of such a generated wireless network performance image that is mapped onto the three dimensional graphic illustration of the two or more floors, the wireless network performance parameter can be a quality of service bandwidth. One method would be assigning a color indicator to each wireless network performance data value, such as by utilizing a plurality of defined value thresholds and ranges as described above, and then generate the wireless network system performance image using a color mapping or overlay graphical representation of each of the one or more floors based on the assigned color indicators for each such floor based on the wireless network performance data value and defined position on such floor layout. This can be, for example, where the wireless network performance parameter is an application level quality of service (QoS) value. In one example, the assigning and color mapping are based on a QoS base for using 4K HD streaming video of 24 Mbps bandwidth. In one example, the assigning of the color coding can be:

a. No perceived performance issues, 100% or greater performance margin=5.0 and the assigned color indicators is a color Green (Measured Bandwidth>48 Mbps);

b. No perceived performance issues, 99-25% performance margin=4.9 to 4.0 with an assigned color indicator of a color Light Green (47 Mbps>Measured Bandwidth>30 Mbps);

c. Possible perceived performance issues, 25 to 0% performance margin=3.9 to 3.0 with an assigned color indicator of a color Yellow (29 Mbps>Measured Bandwidth>24 Mbps);

d. Minor to Medium performance issues, 99% to 85% required performance=2.9 to 2.0 with an assigned color indicator of a color Orange (23 Mbps>Measured Bandwidth>20.4 Mbps);

e. Significant performance issues, 85% to 60% required performance 1.9 to 1.0 with an assigned color indicator of a color Light Red (20 Mbps>Measured Bandwidth>14.4 Mbps); and f. Little to no performance, 59 to 0% required performance 1.0 to 0 with an assigned color indicator of a color Dark Red (14 Mbps>Measured Bandwidth).

Figure 18:
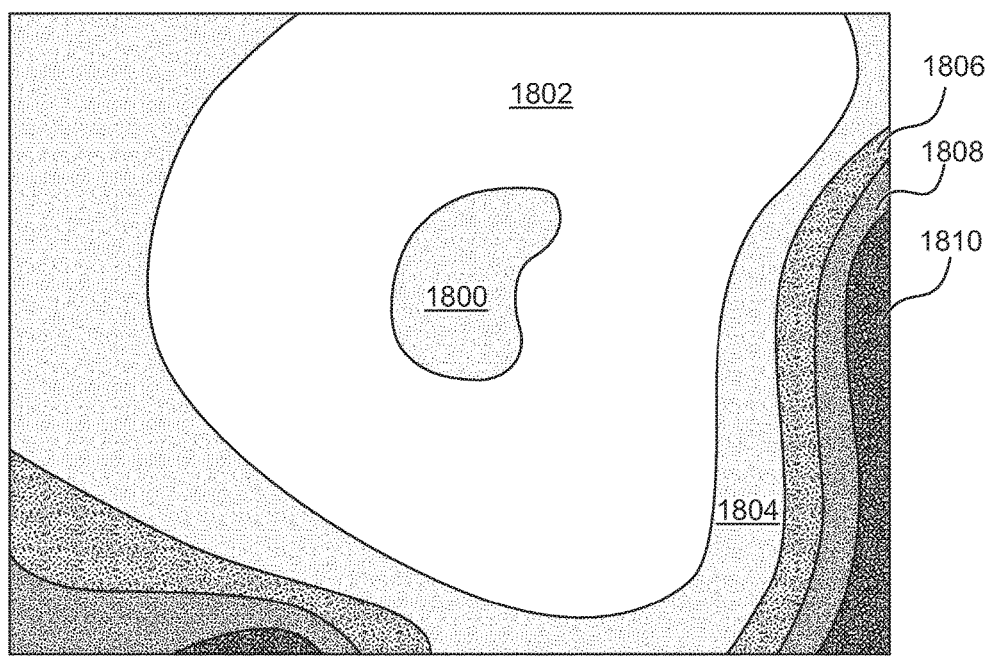

For example, FIG. 18 depicts an embodiment of a heat map or boundary map illustration of a wireless network performance data set. For example, areas 1802, 1804, 1806, 1808, and 1810 may represent levels of service a, b, c, d, e, and f, respectively, as defined above. Assignments and definitions for the color indicator and subsequent generating of the color mapping, allow the user to visualize the performance of the wireless network across one or more floors of a building. The location of the boundaries between the various color bands is determined based on the boundary values defined related to the depicted parameter, such as the 4 k HD Streaming Video described above. This can provide a significant improvement over prior art systems. Of course one skilled in the will understand that other parameters and performance including various allocated assignment of levels or varying allocations within the color spectrum to values for one or more for one or more radio frequencies or frequency bands, a power, a frequency, a polarization, a phase shift, a modulation, a protocol, a signal to noise ratio (SNR), Signal-to-interference-plus-noise ratio (SINR), a received signal strength indicator (RSSI); a bandwidth, a time delay, a congestion, an interface standard, and an application level performance metrics such as a quality of service (QOS) metric such as for video streaming, audio streaming, gaming, and web browsing.

Figure 22:
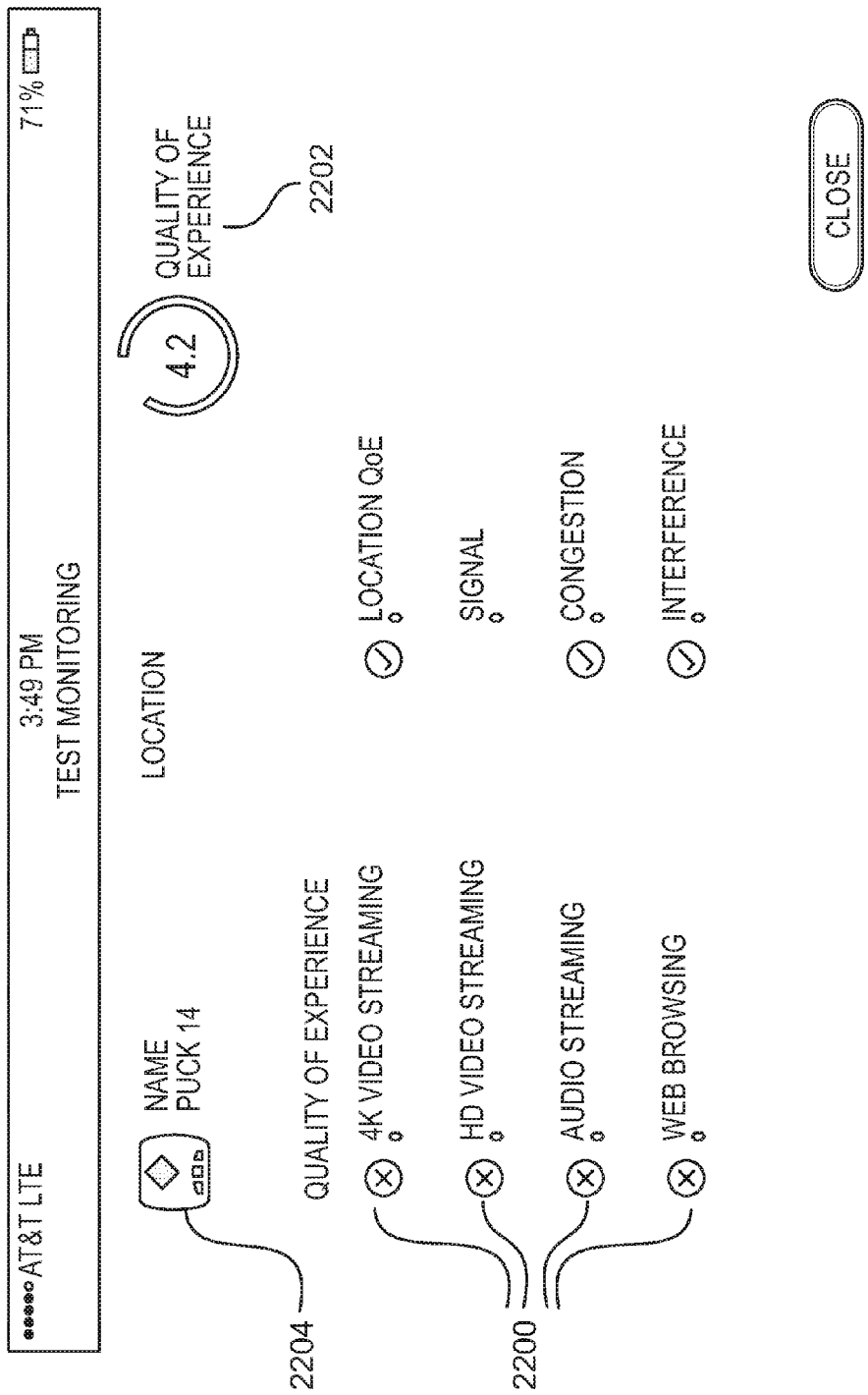
FIG. 22 is a depiction of a graphical user interface providing detailed information for a network wireless device, including wireless performance or other data for a wireless network device according to one embodiment of the disclosed system and method.

FIG. 22 is a depiction of an embodiment of a graphical user interface providing additional detail on the performance measured by a particular wireless instrument 1326 to identify particular wireless network performance or other data for that particular wireless network device. The detail view may provide performance information and levels of service for a variety of parameters and types of network usage. Embodiments of the graphical user interface that display an icon at the location of the wireless instruments 1326 on a floor layout may allow a user to activate the icon by clicking with a user input device, touching the icon on a touch screen, or otherwise activating the icon in a manner known in the art of graphical user interface software. In some embodiments of the disclosed system, activation of such an icon may prompt the system to display a graphical user interface similar to that depicted in FIG. 22. Other methods of activating the user interface shown in FIG. 22 may be utilized to access the same information.

In the depicted graphical user interface, detailed information regarding the performance data collected by a wireless instrument 1326 may be presented to a user. Information 2200 about varying performance measurements may be provided as numeric or graphical indicators of performance. Overall estimates of network performance may also be provided, such as "quality of experience" measurement 2202. Such a user interface will typically provide identifying information 2204 regarding the wireless instrument 1326.

Figure 23:
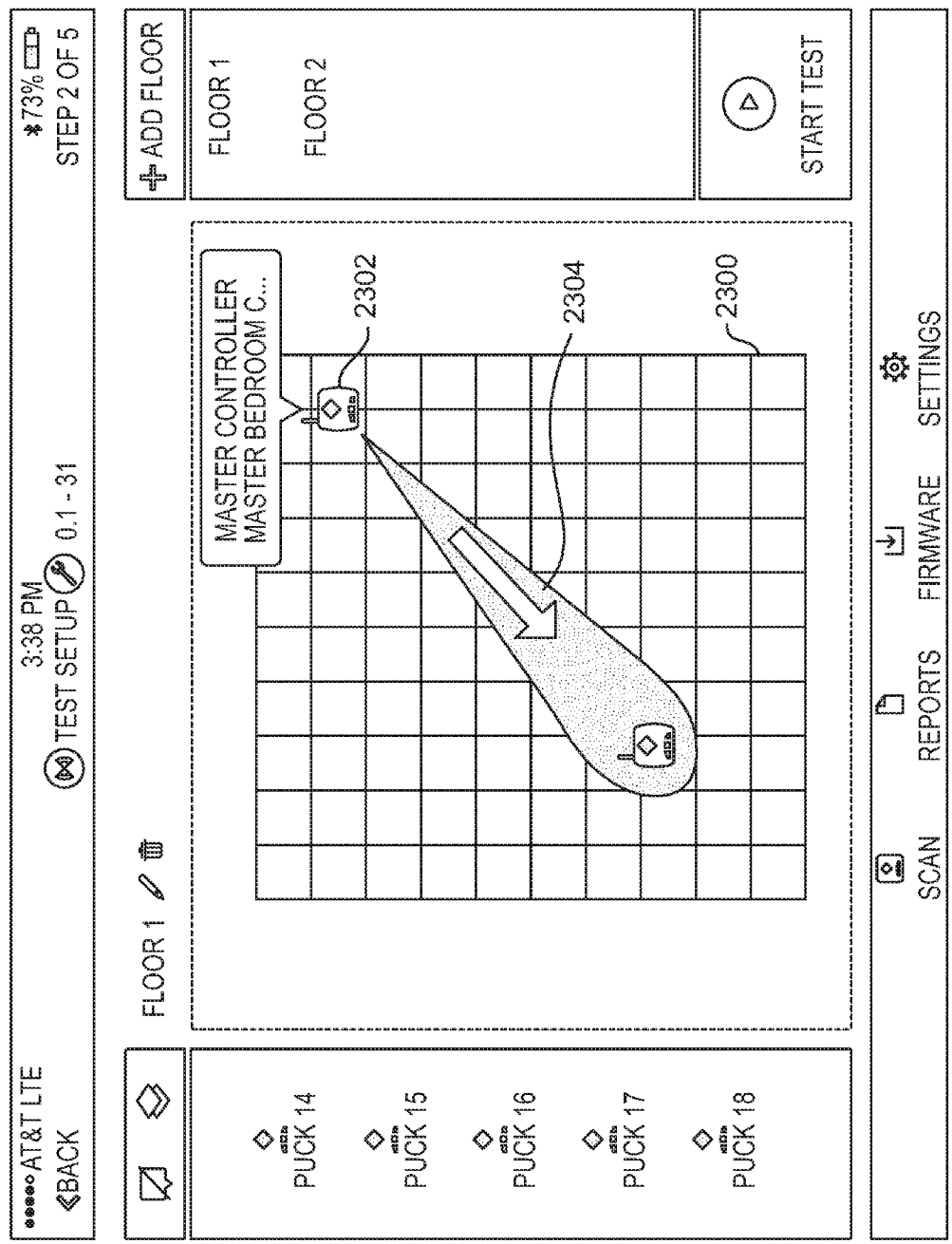
FIGS. 23-25 are depictions of graphical user interfaces for displaying recommended relocation of a wireless network device according to one embodiment of the disclosed system and method.
Figure 24:
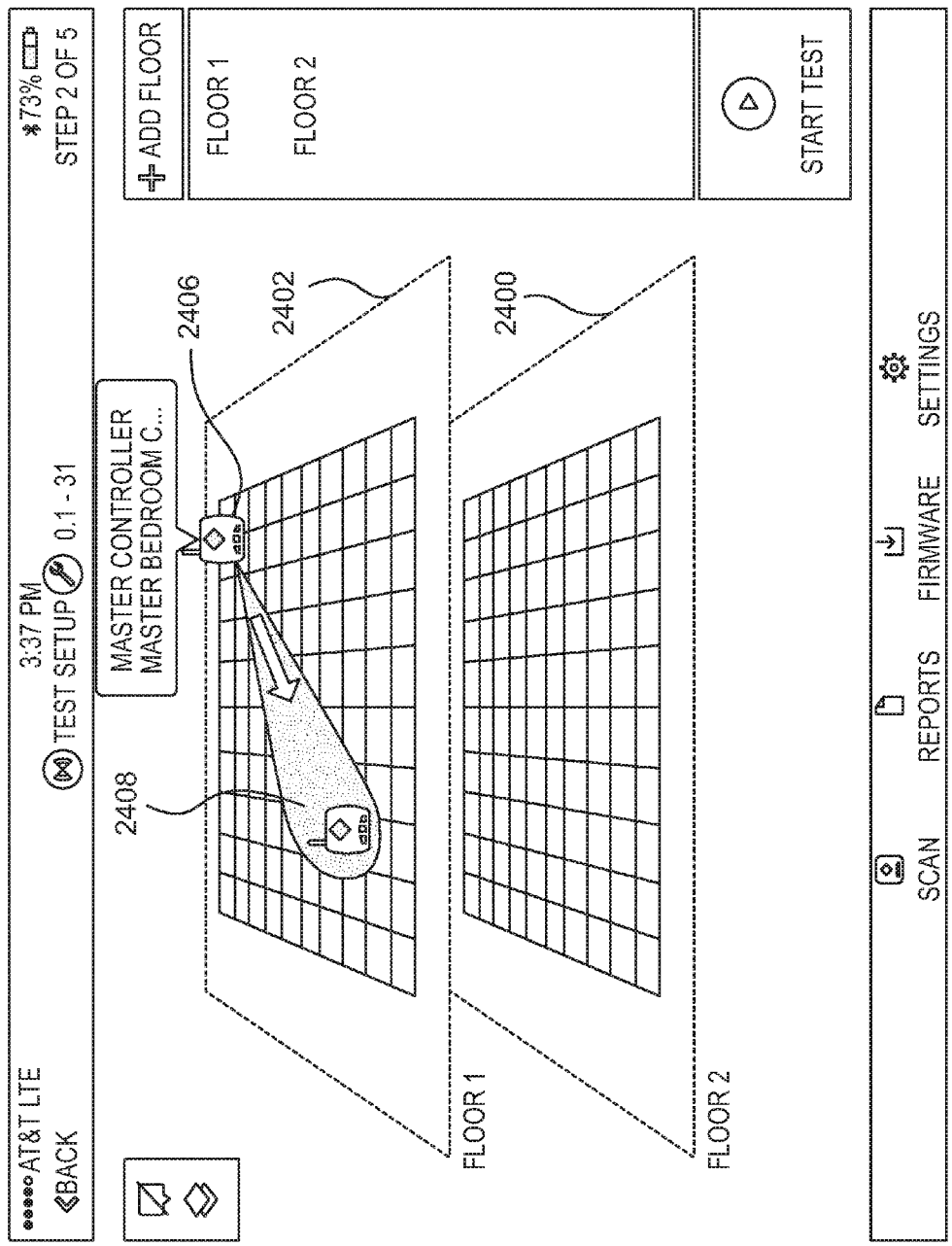
Figure 25:
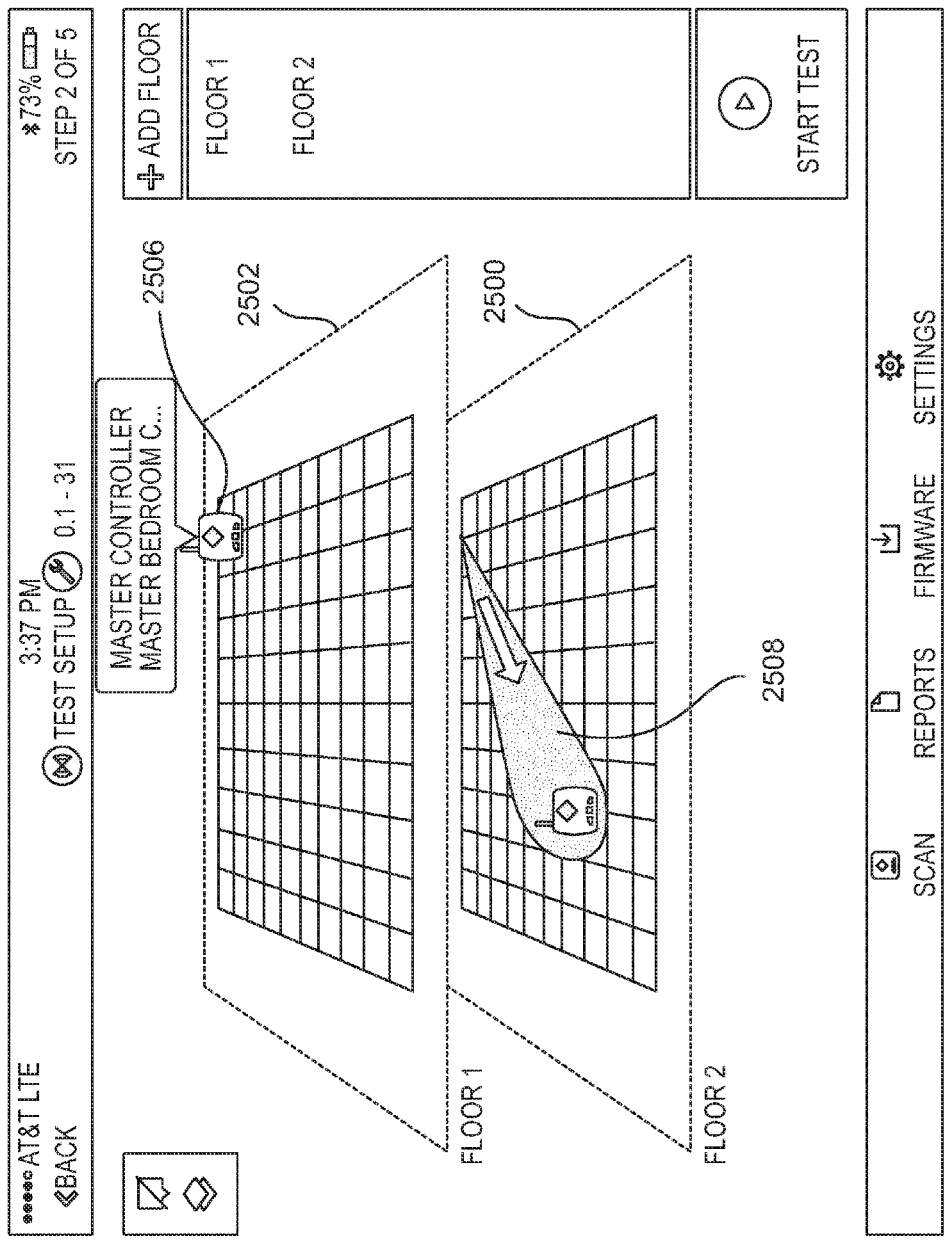

Referring now to FIGS. 23, 24, and 25, depictions of embodiments of graphical user interfaces for the system disclosed herein are shown. The depicted user interfaces provide recommendations regarding relocation of wireless network components to improve performance of the wireless network. Based on testing performed using the master controller 1328 and wireless instruments 1326, the system determines whether the wireless network performance could be increased by moving the master controller 1326 to a different location. This corresponds to a recommendation to move network gateway 1322 for actual installation of the wireless network in the building.

Referring to FIG. 23, the user interface includes a two dimensional floor layout 2300 showing the location 2302 of the master controller during the collection of testing data. Graphical element 2304 indicates a recommended position for the network gateway 1322 to improve the performance of the wireless network over that measured by the master controller 1328. The graphical element 2304 may incorporate an arrow, animated graphics showing movement, icons disposed at the recommended location, or other graphical elements that are used to show or suggest movement from one location to another. Other graphical methods of indicating the new recommended position for the network gateway may also be utilized in other embodiments.

Referring now to FIG. 24, a similar depiction of an embodiment of a user interface showing a three dimensional projection view of a building profile having two floor layouts 2400 and 2402 is shown. The depicted building profile shows the location 2406 on floor layout 2402 of the master controller during the collection of test data. Graphical element 2408 indicates the recommended relocation of network gateway 1322 to improve the performance of the wireless network.

Referring now to FIG. 25, another depiction of an embodiment of a user interface showing a three dimensional projection view of a building profile having two floor layouts 2500 and 2502 is shown. In the depicted embodiment, the location 2506 is shown on the floor layout for "Floor 1". The system has recommended a location for network gateway on the floor layout for "Floor 2" by graphical element 2508 shown on the lower floor layout. In other embodiments the graphical element 2508 may extend at an angle from location 2506 to the recommended location, or other graphical elements may be included to show the movement of the location 2506 from one floor to another.

In other embodiments, the system may recommend an additional network gateway to improve the performance of the wireless network. The system may recommend a specific position for the additional network gateway or just provide a general recommendation to add such a device.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the example embodiments and implementations described above without departing from the scope of the disclosure. It should be understood that various aspects of the disclosure may be implemented individually or in combination with one another. It should also be understood that the detailed description and drawings, while indicating certain example embodiments, are intended for purposes of illustration only and should not be construed as limiting the scope of the disclosure.

It is further to be understood that the processes described herein are not to be construed as necessarily requiring their performance in the particular order discussed or illustrated. It is also to be understood that additional or alternative processes may be employed.

What is claimed is:

1. A method for analyzing the performance of a wireless network in a building having at least one floor, the method comprising:
   receiving at least one floor layout for corresponding to one of the at least one floor of the building;
   receiving a location of at least one deployable testing instrument on a floor layout;
   receiving at least one wireless network performance data set having wireless network performance data values for a wireless network performance parameter of the at least one deployable testing instrument;
   generating a three dimensional projection of each of the at least one floor layouts, wherein each of the at least one floor layouts is depicted in a spaced apart relationship to the other at least one floor layouts in a manner representative of the physical relationships of the at least one floor in the building; and
   generating a wireless network performance image on the three dimensional projection of at least one of the at least one floor layout comprising a graphical representation of different levels of wireless network performance data values relative to at least one floor layout;
   including in the graphical representation a relocation suggestion in the at least one floor layout, the relocation suggestion being determined by the at least one wireless network performance data set of the of the at least one deployable testing instrument.

2. The method of claim 1, wherein generating a wireless network system performance image comprises:
   generating an image representative of the wireless network performance data values applicable to one of the at least one floor layouts; and
   projecting the image onto the three dimensional projection of the floor layout.

3. The method of claim 2, wherein generating an image representative of the wireless network performance data values comprises:
   mapping the wireless network performance data values to colors; and
   generating an image comprising the mapped colors at the position of each data value.

4. The method of claim 2, wherein generating an image representative of the wireless network performance data values comprises:
   selecting boundary values between selected levels of performance;
   assigning each wireless network performance data value to a selected level of performance based on the relationship between the data value and the boundary values; and
   generating an image depicting the location of the boundaries between the selected levels of performance on the floor layout along with the relocation selection.

5. The method of claim 4 wherein the relocation suggestion comprises a linear indication appearing along with the levels of performance.

6. The method of claim 2 wherein generating an image representative of the wireless network performance data values comprises generating a heat map image representative of the data values for the floor layout.

7. The method of claim 1 wherein the at least one floor layout is a three dimensional data set defined within a floor coordinate system and the location of the at least one deployable testing instrument comprises three dimensional data in the floor coordinate system; and
   wherein generating the three dimensional projection of the at least one floor layout further comprises aligning the floor coordinate systems of each of the at least one floor layouts and projecting the three dimensional data onto the three dimensional projection.

8. The method of claim 7 wherein the wireless network performance data values are related to a location defined by a three dimensional coordinate data within the floor coordinate system; and
   generating a wireless network performance image comprises projecting the three dimensional coordinate data onto the performance image.

9. The method of claim 8 wherein generating the wireless network performance image comprises projecting a three dimensional color coded mapping of the at least one wireless network performance data values to the locations defined by the three dimensional coordinate data.

10. The method of claim 8 wherein generating the wireless network performance image comprises generating a wire frame mapping of the wireless network performance data values, and projecting the wire frame mapping onto the performance image.

11. The method of claim 1 wherein the at least one floor layout comprises a multi-floor layout including an upper floor, and a lower floor, and receiving the multi-floor layout of the building comprises:
   presenting, on a computing device having a display, a graphical user interface having graphically enabled tools for creating the multi-floor layout;
   creating an illustration including both of the upper and lower floor layouts;
   specifying the spaced apart relationship between each of the upper and lower floor layouts; and
   specifying the location of the at least one deployable testing instrument on one of the upper and lower floor layouts.

12. The method of claim 11 further comprising receiving a device profile for at least one deployable testing instrument, the device profile including one or more of: a type, a model, and a technical parameter.

13. The method of claim 11 further comprising receiving a device identification for the at least one deployable testing instrument selected from the group consisting of a wireless network router, a wireless network gateway, a wireless network access point, a wireless network repeater, a wireless network range extender, a wireless network antenna, and a wireless network user device.

14. The method of claim 1 further comprising:
analyzing the at least one wireless network performance data set to identify a recommended location for a wireless device; and
the directional suggestion includes depicting the recommended location on the three dimensional projection of one of the at least one floor layouts.

15. The method of claim 1 wherein a first wireless network device selected from the at least one deployable testing instrument is a wireless network master controller, and wherein a second wireless network device selected from the at least one deployable testing instrument is a wireless network instrument for measuring wireless network performance data values.

16. The method of claim 15 wherein the wireless network performance data values comprise data values measured by the wireless network instrument.

17. The method of claim 1 wherein the wireless network performance parameter is selected from the group consisting of a radio frequency signal strength for one or more radio frequencies or frequency bands, a power measurement, a frequency response, a polarization measurement, a phase shift measurement, a modulation measurement, a signal to noise ratio measurement, a bandwidth measurement, a time delay measurement, a network congestion measurement, and application level performance metrics such as a quality of service metrics for video streaming, audio streaming, gaming, and web browsing.

18. The method of claim 1 wherein the relocation suggestion includes a recommended floor-level change.

19. The method of claim 1 comprising:
generating the three-dimensional projection such that a representative depiction of the at least one wireless device, the representative depiction appearing in the projection at a position representative of an actual placement of the at least one wireless instrument.

20. A system for analyzing the performance of a wireless network in a building having at least one floor, the system comprising:
testing devices including (i) a deployable wireless network master controller, and (ii) a plurality of deployable wireless instruments, each of the wireless instruments configured to measure at least one wireless network performance parameter and each further configured to emulate any of a variety of distinct network activities;
a computing device configured to generate a graphical user interface configured to display a wireless network performance image received from the system application;
wherein the wireless network master controller and the plurality of wireless instruments are configured to form a wireless network in the building; and
wherein each of the wireless instruments is configured to measure at least one wireless network performance data value for at least one wireless network performance parameter of the wireless network; and
wherein the wireless network master controller is configured to receive the at least one wireless network performance data value from at least one of the wireless instruments in the plurality; and wherein the computing device is configured to receive the at least one wireless network performance data value from the wireless network master controller; and
wherein the computing device is configured to process the at least one wireless network performance data value to generate the wireless network performance image;
wherein the graphical user interface is configured to receive and display the wireless network performance image imposed on a layout of the building;
wherein the wireless network performance image comprises an image representative of the wireless network performance data values applicable to one of the at least one floor, the image also including representative depictions of each of the plurality of wireless instruments, the representative depictions appearing in the layout at positions representative of actual placements of the plurality of wireless testing instruments in the building;
the wireless network performance image is included on a three-dimensional projection of the at least one floor layout, the image further comprising a graphical representation of different levels of the at least one wireless network performance data value relative to the layout; and
including in the graphical representation a relocation suggestion in the layout, the relocation suggestion being determined by the at least one wireless network performance data set of the of the at least one wireless instrument.

21. The system of claim 20 wherein the wireless network performance image comprises a mapping of the wireless network performance data values to colors representative of the data values at a plurality of locations on the at least one floor.

22. The system of claim 20 wherein the wireless network performance image comprises boundaries between selected ranges of data values at a plurality of locations on the at least one floor.

23. The system of claim 20 wherein the representative depictions of the wireless instruments includes an indication of service acceptability measured by the wireless network instrument.

24. The system of claim 23 wherein the indication of service acceptability includes a numerical value relating to a level of service acceptability.

25. A method for analyzing the performance of a potential wireless network in a building, the method comprising:
deploying a master controller testing device and a plurality of wireless testing instruments into different locations in the building;
creating a test network using the master controller and the plurality of wireless instruments;
using a deployed position for the master controller as a potential in-service position for a future access point for the purpose of evaluation;
configuring the wireless instruments to: emulate at least one of a plurality of distinct network activities, and measure a wireless network performance parameter;
locating each wireless instrument in the plurality at a location of an actual or intended client device, the client device being intended for engagement in the at least one distinct network activity;
configuring a computing device to generate a graphical user interface, the user interface displaying: (i) graphical representations of actual locations of the master controller and the wireless instruments in the building; (ii) a wireless network performance image generated into a three-dimensional projection of the layout of the at least one floor, the image using the performance parameter measured by and received from the test network, the performance image including distinct areas, the distinct areas indicating levels of performance acceptability, the performance image being viewable along with the graphical representations of the master controller and wireless instruments; and the projection including a relocation suggestion in the at least one floor layout, the relocation suggestion being determined using the performance parameter measured by and received from the test network.

\* \* \* \* \*